(12) United States Patent
Baker et al.

(10) Patent No.: US 8,272,320 B2
(45) Date of Patent: Sep. 25, 2012

(54) BROILER, CONVEYOR OVEN, AND TOASTER SYSTEM WITH PRESSURIZED AIR GUIDE FOR HEAT AND FLAMES

(75) Inventors: Edward Baker, Windsor, CA (US); Matthew Baker, Windsor, CA (US); Patrick Baker, Windsor, CA (US); Erik Magner, Fort Wayne, IN (US)

(73) Assignee: Nieco Corporation, Windsor, CA (US)

(*) Notice: Subject to any disclaimer, the term of this patent is extended or adjusted under 35 U.S.C. 154(b) by 0 days.

(21) Appl. No.: 12/954,433

(22) Filed: Nov. 24, 2010

(65) Prior Publication Data
US 2011/0139140 A1 Jun. 16, 2011

Related U.S. Application Data

(63) Continuation-in-part of application No. 12/410,012, filed on Mar. 24, 2009, now abandoned, which is a continuation-in-part of application No. 11/849,854, filed on Sep. 4, 2007, now Pat. No. 7,997,189.

(60) Provisional application No. 60/824,419, filed on Sep. 1, 2006, provisional application No. 61/144,693, filed on Jan. 14, 2009.

(51) Int. Cl.
*A47J 37/04* (2006.01)
*A47J 37/06* (2006.01)

(52) U.S. Cl. ............. 99/401; 99/447; 99/385; 126/15 R; 126/41 R

(58) Field of Classification Search ................... 219/388, 219/400, 405, 411; 126/39 R, 15 R, 41 R; 99/401, 385, 447
See application file for complete search history.

(56) References Cited

U.S. PATENT DOCUMENTS

| | | | |
|---|---|---|---|
| 3,720,002 A | 3/1973 | Martin | |
| 3,987,718 A | 10/1976 | Lang-Ree et al. | |
| 4,121,509 A | 10/1978 | Baker et al. | |
| 4,176,263 A | 11/1979 | Rousseau | |
| 4,188,868 A | 2/1980 | Baker et al. | |
| 4,936,286 A | 6/1990 | Baker | |
| 4,951,648 A | 8/1990 | Shukla et al. | |
| 5,906,485 A | 5/1999 | Groff et al. | |
| 6,595,117 B1* | 7/2003 | Jones et al. | ...... 99/386 |
| 7,220,944 B2* | 5/2007 | Miller et al. | ...... 219/388 |
| 2004/0211765 A1 | 10/2004 | McFadden | |

* cited by examiner

*Primary Examiner* — Henry Yuen
*Assistant Examiner* — Jianying Atkisson
(74) *Attorney, Agent, or Firm* — Craig M. Stainbrook; Stainbrook & Stainbrook, LLP

(57) ABSTRACT

A cooking apparatus having a waste heat recovery system for incorporation into broilers, ovens, and toasters, the apparatus including a cooking chamber having a cooking platform, at least one air plenum disposed in the upper portion of the cooking chamber and having a plurality of air outlets for producing a focused forced air, a low pressure air source connected to the air plenums, a heating element or burner disposed under each of said air plenums, such that said curtain of focused forced air guides and directs heat from said heating element toward food product being cooked, and heat exchange pipes disposed between at least two of said air plenums. Radiant heat generated from the heating elements or burners rises in the cooking chamber and is retained between the air plenums to maximize heat transfer from the heated air to the heat transfer pipes, and thus to the low pressure air in the low pressure air system. The recycled heat enhances cooking.

9 Claims, 30 Drawing Sheets

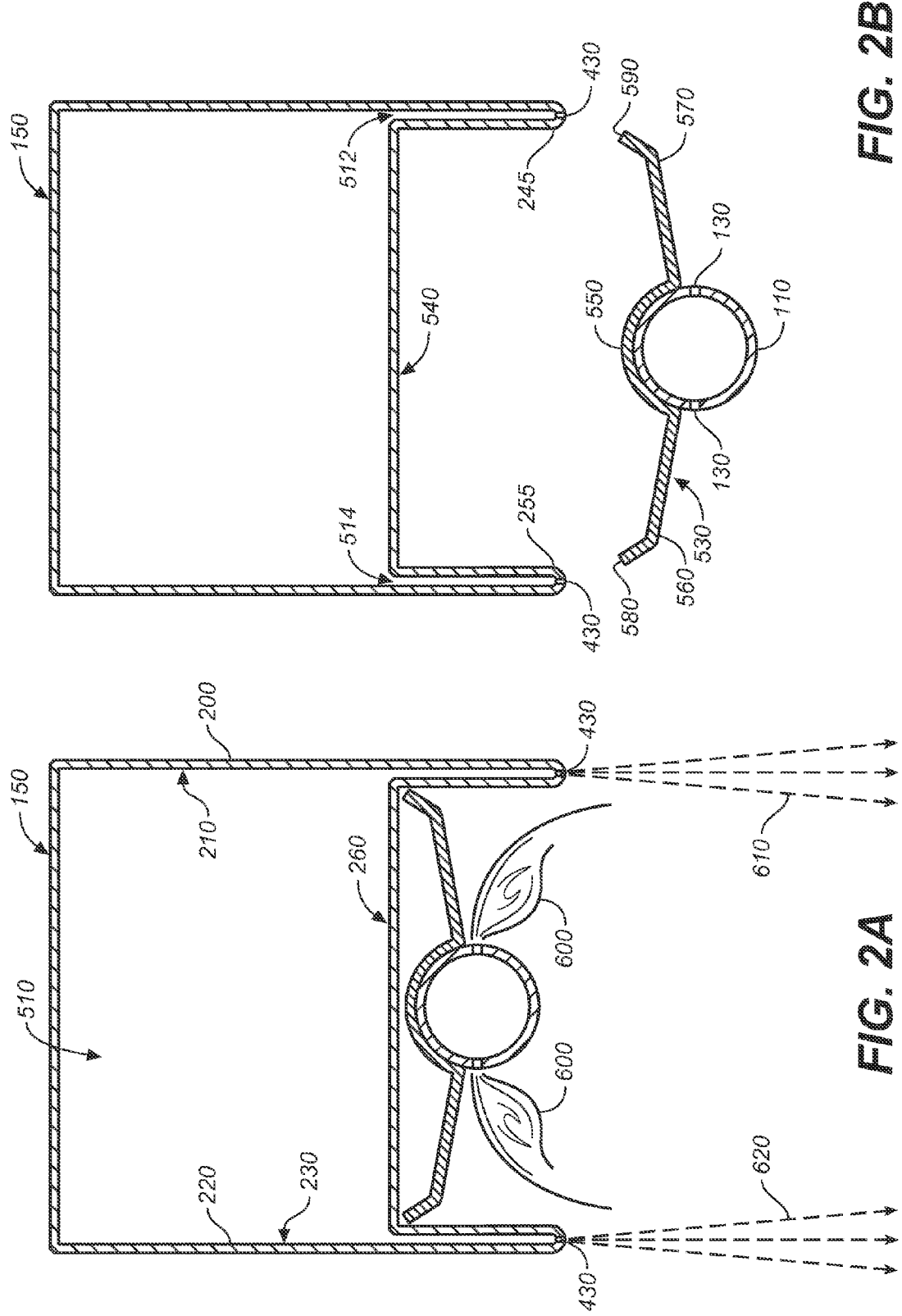

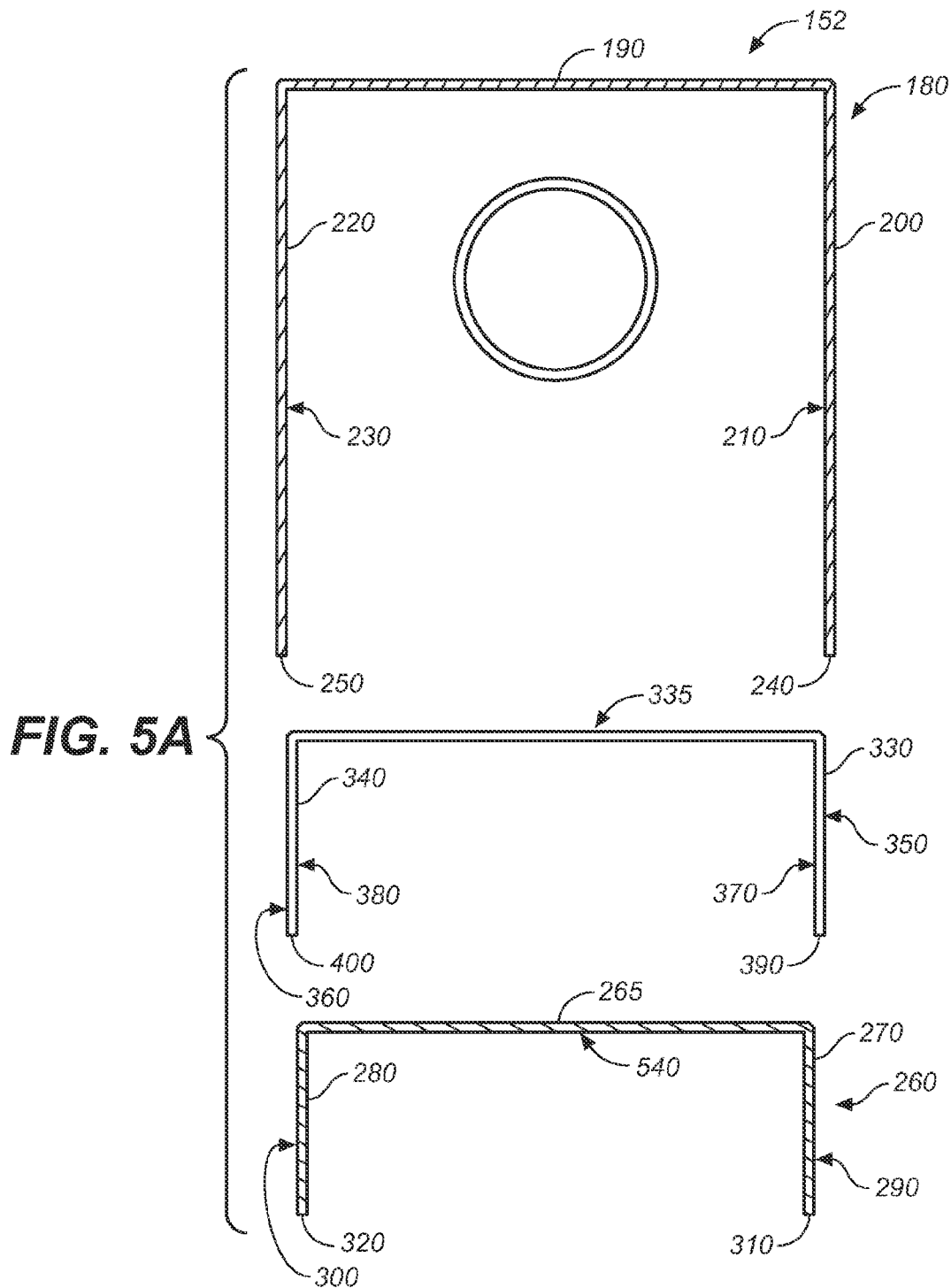

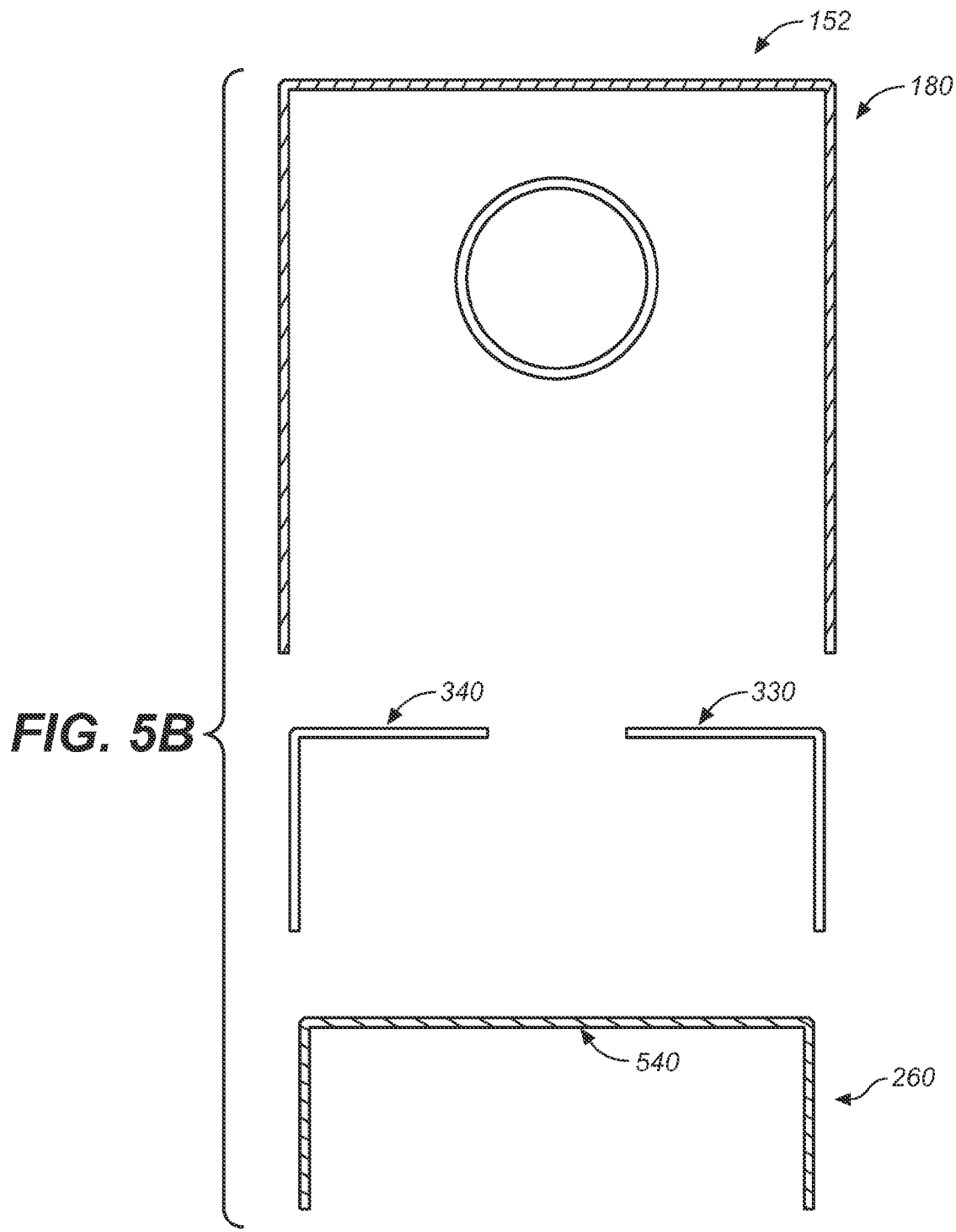

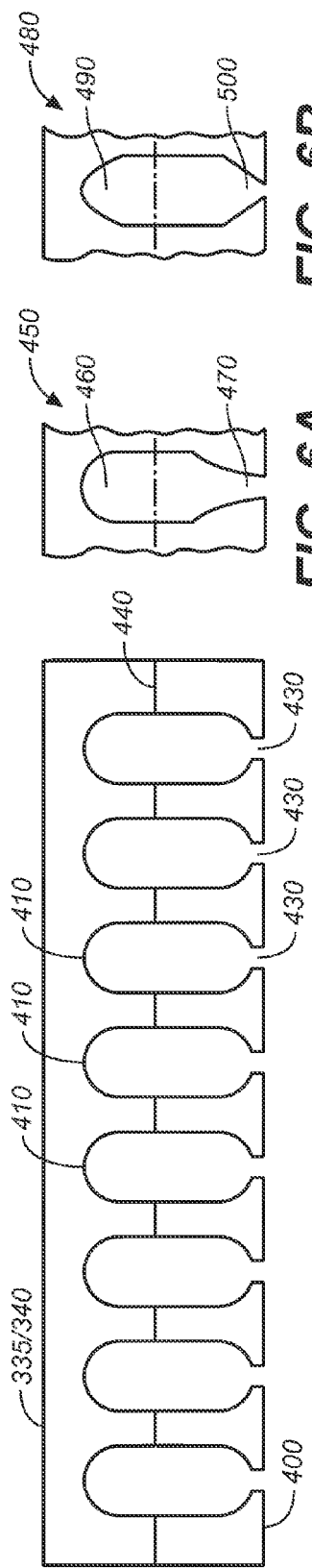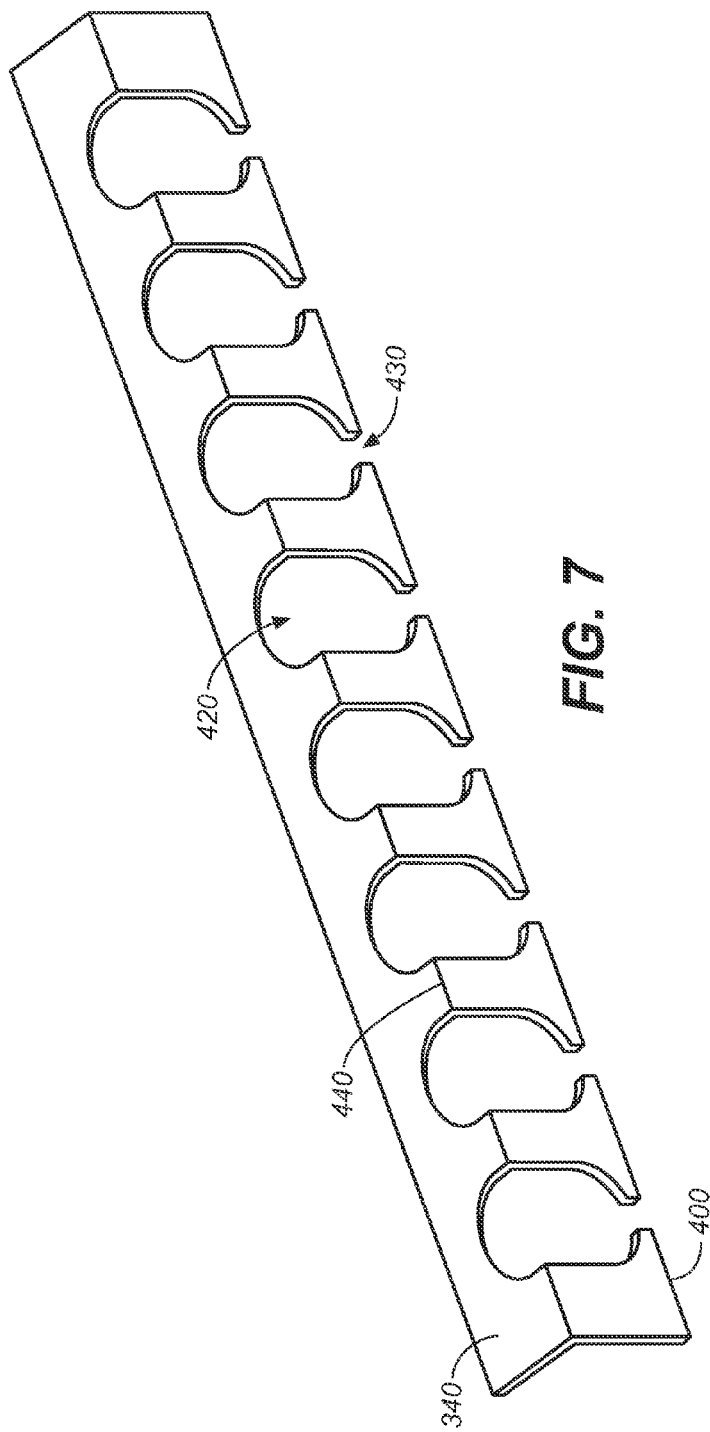

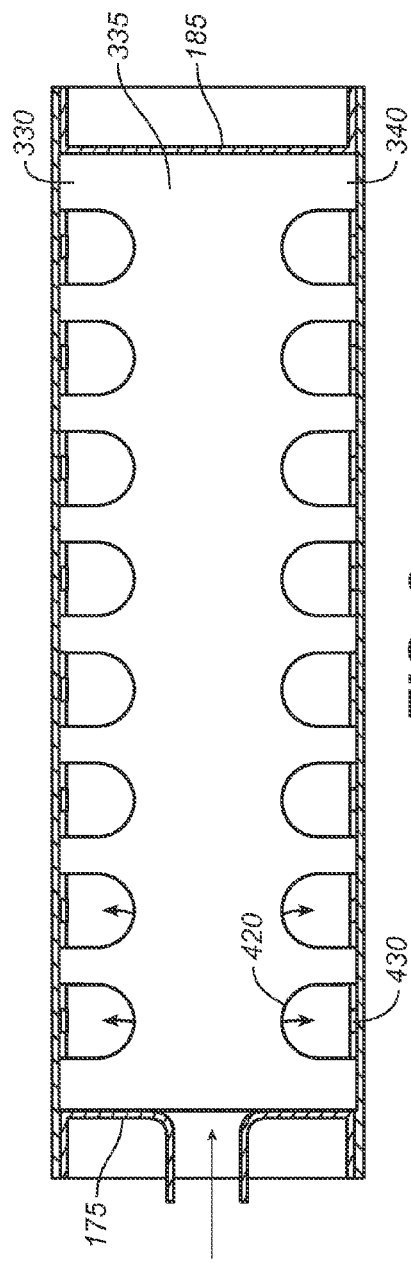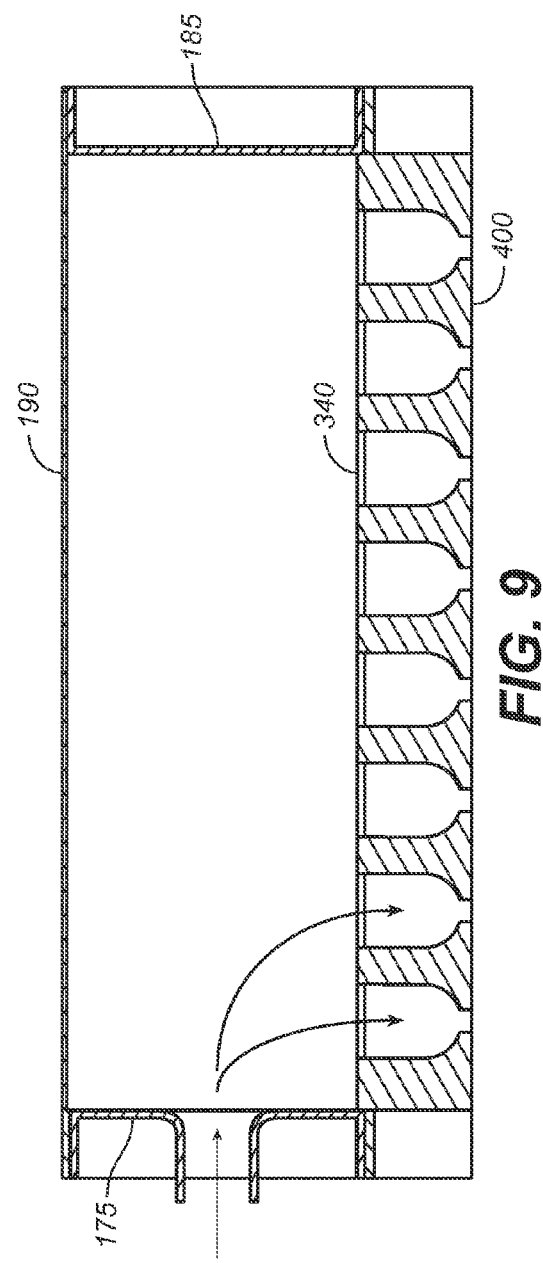

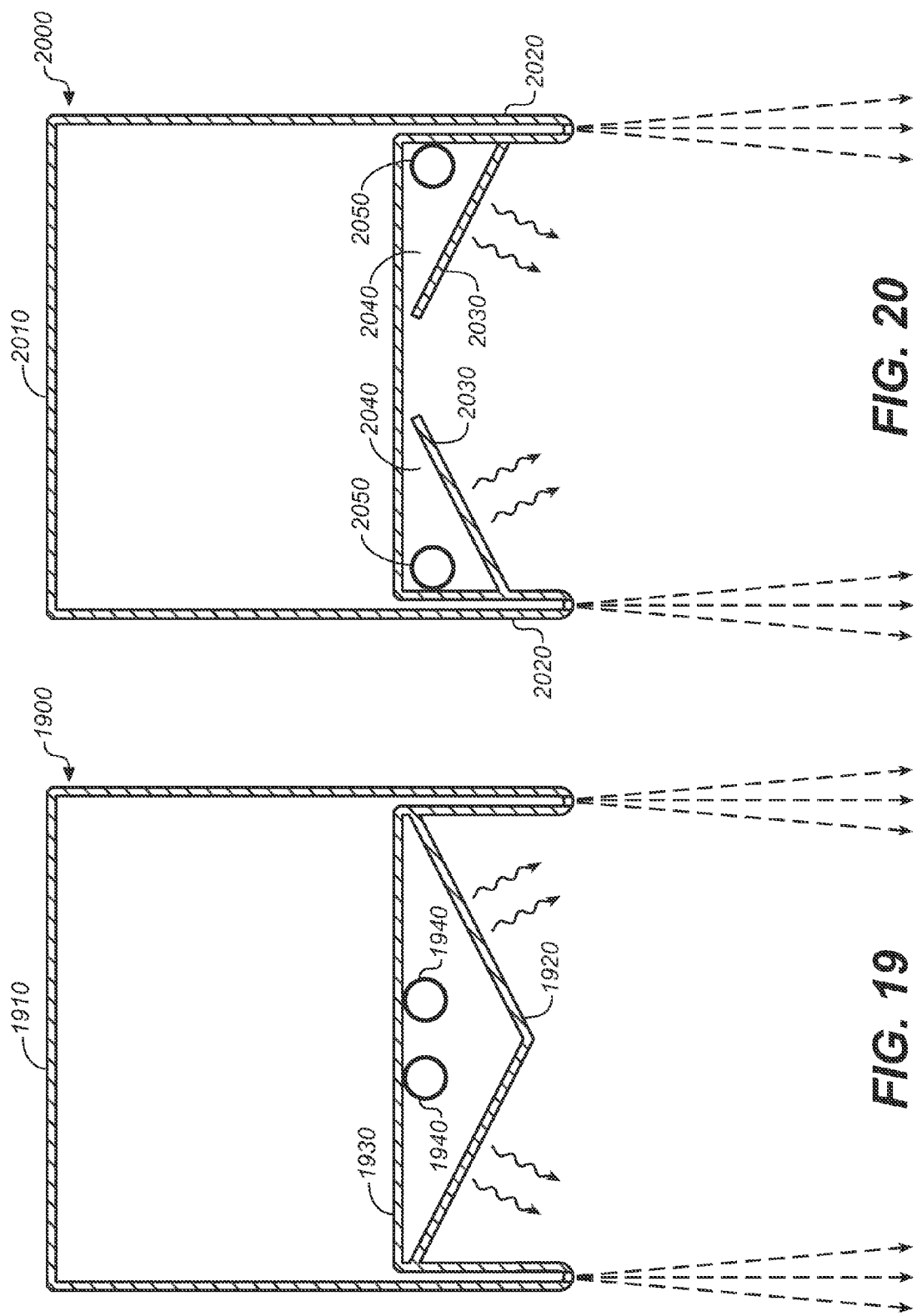

|  | Broiler Group A | 624 Broiler | JF62 Broiler |
|---|---|---|---|
| Preheat Time (min) |  | 10.0 | 28.5 |
| Gas Preheat Energy (Btu) |  | 11,317 | 13,502 |
| Electric Preheat Energy (kWh) |  | 0.42 | 0.10 |
| Gas Idle Energy Rate (Btu/hr) |  | 54,390 | 27,830 |
| Electric Idle Energy Rate (kW) |  | 1.83 | 0.20 |
| Gas Cooking-Energy Rate (Btu/h) |  | 54,390 | 28,420 |
| Electric Cooking-Energy Rate (kW) |  | 1.84 | 0.20 |
| Production Capacity (lb/hr) |  | 28.9 | 20.8 |
| Operating Hours/Day |  | 12 | 12 |
| Operating Days/Year |  | 364 | 364 |
| Pounds of Food Cooked per Day |  | 100 | 100 |
| Gas Cost ($/therm) |  | $1.00 | $1.00 |
| Daily Gas Energy Consumption (Btu) |  | 654,932 | 337,079 |
| Annual Gas Energy Consumption (therms) |  | 2,384 | 1,227 |
| Estimated Gas Savings (therms/yr) |  | - | 1,157 |
| Electric Cost ($/kWh) |  | $0.13 | $0.13 |
| Daily Electric Energy Consumption (kWh) |  | 22.11 | 2.41 |
| Average Demand (kW) |  | 1.84 | 0.20 |
| Estimated Demand Reduction (kW) |  | - | 1.64 |
| Annual Electric Energy Consumption (kWh) |  | 8,408 | 875 |
| Estimated Electric Savings (kWh/yr) |  | - | 7,173 |
| Total Annual Operating Energy Cost ($) |  | $3,430 | $1,341 |
| Estimated Operating Cost Savings ($/yr) |  | - | $2,089 |
| Incremental Measure Cost |  | - | $TBD |
| Estimated Useful Life (EUL) |  | 12 years | 12 years |

FIG. 35

| Broiler Group B | 1424 Broiler without Catalyst | 1424 Broiler with Catalyst | JF143 Broiler with Catalyst |
|---|---|---|---|
| Preheat Time (min) | 8.42 | 8.42 | 46.2 |
| Gas Preheat Energy (Btu) | 14,133 | 14,133 | 30,388 |
| Electric Preheat Energy (kWh) | 0.45 | 0.45 | 0.70 |
| Gas Idle Energy Rate (Btu/hr) | 81,970 | 78,120 | 39,070 |
| Electric Idle Energy Rate (kW) | 1.55 | 1.55 | 0.77 |
| Gas Cooking-Energy Rate (Btu/h) | 78,700 | 78,240 | 38,470 |
| Electric Cooking-Energy Rate (kW) | 1.43 | 1.43 | 0.58 |
| Production Capacity (lb/hr) | 47.6 | 41.7 | 31.6 |
| Operating Hours/Day | 18 | 18 | 18 |
| Operating Days/Year | 364 | 364 | 364 |
| Pounds of Food Cooked per Day | 355 | 355 | 355 |
| Gas Cost ($/therm) | $1.00 | $1.00 | $1.00 |
| Daily Gas Energy Consumption (Btu) | 1,453,700 | 1,410,350 | 696,740 |
| Annual Gas Energy Consumption (therms) | 5,291 | 5,134 | 2,536 |
| Estimated Gas Savings (therms/yr) | - | - | 2,598 |
| Electric Cost ($/kWh) | $0.13 | $0.13 | $0.13 |
| Daily Electric Energy Consumption (kWh) | 27.24 | 27.11 | 11.83 |
| Average Demand (kW) | 1.51 | 1.51 | 0.66 |
| Estimated Demand Reduction (kW) | - | - | 0.85 |
| Annual Electric Energy Consumption (kWh) | 9,914 | 9,868 | 4,307 |
| Estimated Electric Savings (kWh/yr) | - | - | 5,562 |
| Total Annual Operating Energy Cost ($) | $6,580 | $6,417 | $3,096 |
| Estimated Operating Cost Savings ($/yr) | - | - | $3,321 |
| Incremental Measure Cost | - | - | $14,000 |
| Estimated Useful Life (EUL) | 12 years | Broiler- 12 years Catalyst- 5 years | Broiler- 12 years Catalyst- 5 years |

*FIG. 36*

BROILER, CONVEYOR OVEN, AND TOASTER SYSTEM WITH PRESSURIZED AIR GUIDE FOR HEAT AND FLAMES

CROSS REFERENCES TO RELATED APPLICATIONS

The present application is a continuation-in-part of U.S. Continuation-in-Part patent application Ser. No. 12/410,012, filed (Mar. 24, 2009) now abandoned, which is a continuation in part of U.S. Utility patent application Ser. No. 11/849,854, filed (Sep. 4, 2007) now U.S. Pat. 7,997,189, which in turn claims the benefit of the filing date of U.S. Provisional Patent Application Ser. No. 60/824,419, filed (Sep. 1, 2006), and further claims the benefit of the filing date of U.S. Provisional Patent Application 61/144,693, filed (Jan. 14, 2009).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

SEQUENCE LISTING

Not applicable.

BACKGROUND OF THE INVENTION

1. Field of the Invention

The present invention relates generally to gas burners and electric heating elements for use in the rapid cooking of food products in broilers, conveyor ovens, non-conveyor ovens having a fixed oven cavity, and toaster systems, and more particularly to a novel broiler having burners and/or heating elements that cooperate with a pressurized air system that utilizes waste heat to heat air in a low pressure air system which is then introduced into the cooking chamber and directed toward food product in a manner that guides heat and/or flames to areas around and onto food product in a multi-source cooking system. The burner/heating element and pressurized air system are adapted for use in commercial broilers, conveyor ovens, non-conveyor ovens, and toasters for cooking a variety of food products through the combination of radiant heat and forced convection heat.

2. Discussion of Related Art Including Information Disclosed Under 37 CFR §§1.97, 1.98:

To prepare certain foods, such as hamburger patties, sausages, hot dogs, pizza, toasted sandwiches, chicken and fish fillets, and the like, as well as their respective buns, high output commercial food purveyors (principally restaurants) utilize conveyor broiler, oven, and toaster systems that rapidly and continually cook the food products. (As used herein, the term "cooking system" specifically covers broilers, ovens, and toasters, and is intended to include one or more of such systems independently and combined.) These systems provide rapid and high throughput with consistent cooked product results. The systems typically comprise a housing (or cooking chamber) having a horizontal conveyor for moving food product from an input end to an output end. During the cooking process the food passes between one or more gas burner and/or electric heating elements. As may be readily appreciated, the profitability of utilizing such a system hinges on a number of factors, including the rapidity and efficiency with which the food product can be cooked, the minimization of energy and/or fuel utilized in cooking, the ease with which the system can be serviced and cleaned, the quality (and therefore desirability) of the cooked food products, and so forth.

Present day conveyor oven and broiler designs are energy intensive equipment, not only in their direct consumption of electricity and/or natural gas, but also due to the load they place on HVAC systems due to waste. Ovens and broilers call for high exhaust flow rates and create high temperatures in the often small space provided in the kitchen area, creating an uncomfortable environment for kitchen staff. Nonetheless, on-site ovens even in close proximity to diners are desirable inasmuch as they send mouth-watering aromas into the restaurant and produce a cooked product with highly desirable characteristics.

Several rapid cooking systems have been developed for use in the fast food industry, including those described in the following U.S. patents.

U.S. Pat. No. 4,936,286, to Baker, discloses a broiler system having at least two side-by-side broiling conveyors, and broiler units mounted adjacent to the conveyors extending across the combined widths of the two conveyors. To permit different heating conditions on the two conveyors while still permitting the broiler units to be interchangeable and made of interchangeable parts, a broiler unit is provided with a shield which blocks off the heated face of the broiler unit where the broiler unit faces one of the conveyors. The shield preferably carries a portion which extends towards the adjacent edges of two conveyors to prevent lateral heat radiation between the conveyors.

U.S. Pat. No. 4,188,868, to Baker et al, shows a broiler system having a food passageway restricted by baffles, including an entrance shield of heat-reflecting material formed as a fitting over the entrance burner housing and including a baffle sheet extending from the entrance burner housing through most of the gap toward the entrance opening, and an exit shield of similar heat-reflecting material formed as a fitting over the exit burner housing and having a baffle sheet extending from the exit burner housing through most of the gap toward the exit opening. In addition, there is an intermediate shield including a horizontal sheet of similar material resting on adjacent burner housings and having a vertical sheet depending from said horizontal sheet. The entrance shield, the exit shield and the intermediate shield define the upper limits of the passageway through the burner and tend to reflect heat away from the entrance and exit openings and to limit air circulation within and through the passageway.

U.S. Pat. No. 4,121,509, to Baker et al., teaches a housing having a passageway through which a continuous food conveyor operates, taking food products from an inlet end to an outlet end. Within the passageway the food products are exposed to infrared radiation from heaters, hot air blown from a fan through a supply duct and through groups of nozzles onto the patties, and steam or hot water vapor provided through the air supply. By using three different types of heat supply—direct infrared radiation, warm air, and water vapor—the system provides a quickly cooked food product having a relatively high moisture content.

U.S. Pat. No. 3,987,718 to Lang-Ree et al., discloses a hamburger patty and bun cooker having a frame supporting lower and upper heated platens. A product conveyor, typical of such systems, moves food product from the inlet to the outlet. At least one of the platens is provided with a low-friction layer between it and an advancing patty. The layer is constituted by jets of hot air discharged over the platen surface or by a Teflon-coated thin, metal foil sheet or by a Teflon-carrying thin, fiber glass sheet, the sheets being readily changeable. Bun portions for the individual patties are advanced on the same frame in paths parallel to the hamburger patties by comparable endless conveyors and are heated by individual platens on the frame as the bun portions advance.

The foregoing patents reflect the current state of the art of which the present inventors are aware. Reference to, and discussion of, these patents is intended to aid in discharging Applicants' acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

SUMMARY OF THE INVENTION

The present invention is an improved heating system that simultaneously provides a focused forced-convection and radiant heating cooking system. The heating unit preferably employs a gas burner element or radiant electric element as the principal heat source, though it may use both in combination. Using gas and/or electricity, the heating unit includes several novel elements. Most notable among those novel elements is the provision and use of a waste heat recovery system that transfers heat from the cooking chamber to a heat transfer pipe and then on to air flowing through a pressurized air system employed during one or more stages of the cooking.

In the best mode of practicing the invention, the present invention combines convective air and radiant heat into a unified burner system that incorporates a waste heat recovery pressurized air system to transfer waste heat from the cooking chamber to air circulated through air supply pipes provided with fresh air by a pressurized air system. Waste heat rising in the cooking chamber is optimally retained for heat transfer by a baffle system characterized by a dome disposed over the burners and the heat transfer air supply pipes.

After air is heated in the heat transfer pipes of the low pressure air system, it is injected into air plenums that distribute and direct the air to a plurality of nozzles disposed on the tips of wings angled from the bottom of the air plenums. The nozzles direct the heated fresh air to guide and direct focused heat and/or flames to create an energy efficient air curtain that impresses and impinges heat onto cooking food product. The heated air comprises the focused forced-convective characteristics of the cooking system, while the hot burners and surrounding structures over architectures provide a radiant heat source. The balance of heating effects can be instantaneously tailored and regulated by adjusting the air pressure itself. When air pressure is reduced, the convection air stream is reduced, and more heat will therefore be employed to increase burner bottom surface temperature, thereby increasing the contribution by radiant heat. Less immediate, but similarly flexible adjustments and tailoring, can be accomplished by modifying the shape, number, orientation, and spacing of each or both of the air outlet nozzles and the burner outlet nozzles. In such a manner, the cooking characteristics of the oven can be matched to the ideal cooking conditions for the cooked foods produced by the user.

This unique design provides an efficient transfer of waste heat and energy from the heating source (heating elements and heat reflective structures) to the food products. The protective air curtain provided by the pressurized air system focuses and directs air heated by waste heat in a way that minimize heat loss from the cooking chamber. Significant energy savings is thereby realized.

A first preferred embodiment of the inventive system includes a unit employing a gas burner element, in which there is provided a generally cylindrical gas pipe having gas outlets along the right and left sides of its entire length. The pipe may be any of a number of shapes and configurations, and when a conventional round pipe is used, the gas outlets are preferably disposed at roughly the 3 o'clock and 9 o'clock positions or the 4 o'clock and 8 o'clock positions, though it will be appreciated that the outlets may be oriented in any of a number of suitable positions, and there is no requirement that they be linearly aligned along the length of the burner or that they are provided along the entire length of the burner. An air plenum is disposed over the burner element substantially the entire length of the element, and pressurized air (i.e., higher than ambient pressure) is pumped into the plenum. In the first preferred embodiment, the plenum comprises an upper and a lower U-shaped channel which may be discrete and attached or either formed integrally, and it includes two arrays of air outlet nozzles either integrally formed within the plenum or comprising two L-shaped nozzle plates interposed between the lower and upper U-shaped channels at each side of the plenum. In either arrangement, the row or linear array of shaped orifices allow pressurized air to pass outwardly and downwardly from the plenum. In alternative embodiments, the plenum may be configured in shapes other than U-shaped to position air outlet nozzles on only one side of the heating element(s). The arrays are therefore disposed on either one or both sides of the heating element(s). In the case of gas burners, the air outlet nozzles are oriented in an array which is generally parallel to the gas orifices in the burner element. Each of the gas orifices may be matched with a proximate air orifice, though the match in number is not essential. The most important characteristic is that the air outlet array provide an effective air curtain to contain and direct heat. Accordingly, the inventive apparatus provides pressurized air that passes through the air orifices in thin jets from the plenum and around the gas flames. Thus, the heat from the flames, as well as the flames themselves, are directed downwardly toward the food product by the moving air streams. When used to cook food products, the hot air moved in this fashion breaks up the water vapor envelope that typically covers and insulates the food product as it initially thaws and/or evaporates water and begins heating. When used with thawed food product, the hot air evaporates water and begins heating. This use of hot air facilitates faster cooking and enhances browning. The air also facilitates complete oxidation of the gas fuel, thereby increasing efficiency, saving on energy costs, and reducing pollution. The air jets will help the heat penetrate the food product to improve heating of interior portions of the food.

The gas burner element in the first preferred embodiment of the inventive system additionally includes a novel wing or shroud design that directs and distributes gas flames so as to spread the heat provided by the elements and to create a radiant heating surface on the underside of the shroud.

In another embodiment, the gas burner may be replaced with an electric heating element. The configuration of the air plenum may be modified in a number of ways to better cooperate with the heat distribution characteristic of the particular electric elements employed, the oven cavity shape, the over interior, burner, and plenum materials and therefore the radiant heating characteristics, and the conveyor system or lack thereof. Otherwise, the compressed air system, including the plenum, is essentially identical in its essential purpose and function.

In addition, the air plenum contains a certain volume of heated air that serves as energy storage. In case a cooking system was put in a hibernating or energy saving mode with the burners or heating elements in a reduced power condition and with the air flow to the air plenum set to low or shutoff, the energy stored in the heated air of the air plenum can be used to quickly restart cooking and return it to full operating conditions.

The size of the air plenum is significant for sustained heat recovery of a cooking system during high load/high quality cooking The larger the air plenum, the easier it is for a cooking system to recover.

An air plenum may be for a single burner (element), or multiple burners (elements).

An air plenum may also use re-circulated heated air. In this case, heated air would be taken from the cooking chamber and then returned to the air plenum via an air blower or venturi heat-inducing system for increased energy efficiency.

Many cooking systems have cool edges due to heat losses at the extremities of the cooking surface. The air plenum box orifice holes can be customized to even out the cooking of product by compensating for the loss of heat with additional hot air directed into the cool areas.

The orifices of the air plenum for the air jets can also be used to introduce sear marks or other random or unique pattern dark markings on the food. Alternatively, distinctive sear or dark marks can be eliminated by different configuration of the orifice holes and air pressure adjustment.

In yet another preferred embodiment an air-to-air waste heat recovery system can be incorporated into a conveyor broiler assembly, or into oven or toaster assemblies. The system achieves unexpected energy savings by utilizing waste heat from the radiant heat source and utilizes it to pre-heat air in a low pressure air system before the air is directed in a focused curtain down onto food product conveyed through the cooking chamber. A blower provides the supply of pressurized fresh air to a first heat transfer pipe that traverses the upper portion of the cooking chamber and enters a first air plenum box mounted the upper cooking chamber walls. Air passes through air outlets disposed at the lower ends of the wings that extend down from the plenum and angle inwardly toward the center of the cooking chamber. A second heat transfer pipe connects the first air plenum to a second air plenum, configured in a similar manner. A cap is disposed immediately above the top sides of the air plenums and serves to confine rising hot air, temporarily capturing it in the air space between the air plenums and occupied by the heat transfer pipes. The hot air is retained in that space until its volume and kinetic energy are sufficient to have it spill outside the footprint of the air plenums and rise past them where it is vented outside. The cooperating elements form a baffle system that facilitates the transfer of waste heat from hot cooking chamber air to the air in the forced air system, such that the focused curtain of forced air directed downwardly at food product is between 450° and 850° F.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF THE DRAWINGS

The invention will be better understood and the objects of the invention will become apparent when consideration is given to the following detailed description thereof. Such description makes reference to the annexed drawings wherein:

FIG. 2A is a cross-sectional front end view in elevation showing the burner flame pattern as affected by the air output from the air plenum, the view taken along section line 2A-2A of FIG. 1B;

FIG. 2B is an exploded cross-sectional front end view in elevation of the apparatus of FIG. 2A;

FIG. 5A is an exploded cross-sectional end view showing a first preferred embodiment of the air plenum with nozzle plate assembly;

FIG. 5B is cross-sectional end view showing an alternative embodiment of the air plenum and nozzle plate;

FIG. 6 is a top plan view of a nozzle plate shown before bending along the bend line;

FIG. 6A is a partial top plan view showing an alternative nozzle opening shape;

FIG. 6B is a partial top plan view showing yet another alternative nozzle opening shape;

FIG. 7 shows an L-shaped nozzle plate with a plurality of nozzles;

FIG. 8 is a cross-sectional top plan view showing the assembled air plenum and nozzle plates;

FIG. 9 is a cross-sectional side view in elevation thereof;

FIGS. 16-20 show various air plenum configurations and air outlet arrays used with side-by-side parallel electric resistance heating elements;

FIG. 35 is a schematic side view in elevation showing a modular cooking system assembly that facilitates rapid removal and replacement of the operative system elements in need maintenance, repair, or replacement; and FIG. 36 is a table comparing energy use and operating costs of a first commercial conveyor broiler with the same broiler modified to include the inventive waste heat recovery system of the present invention.

Figure 1A:
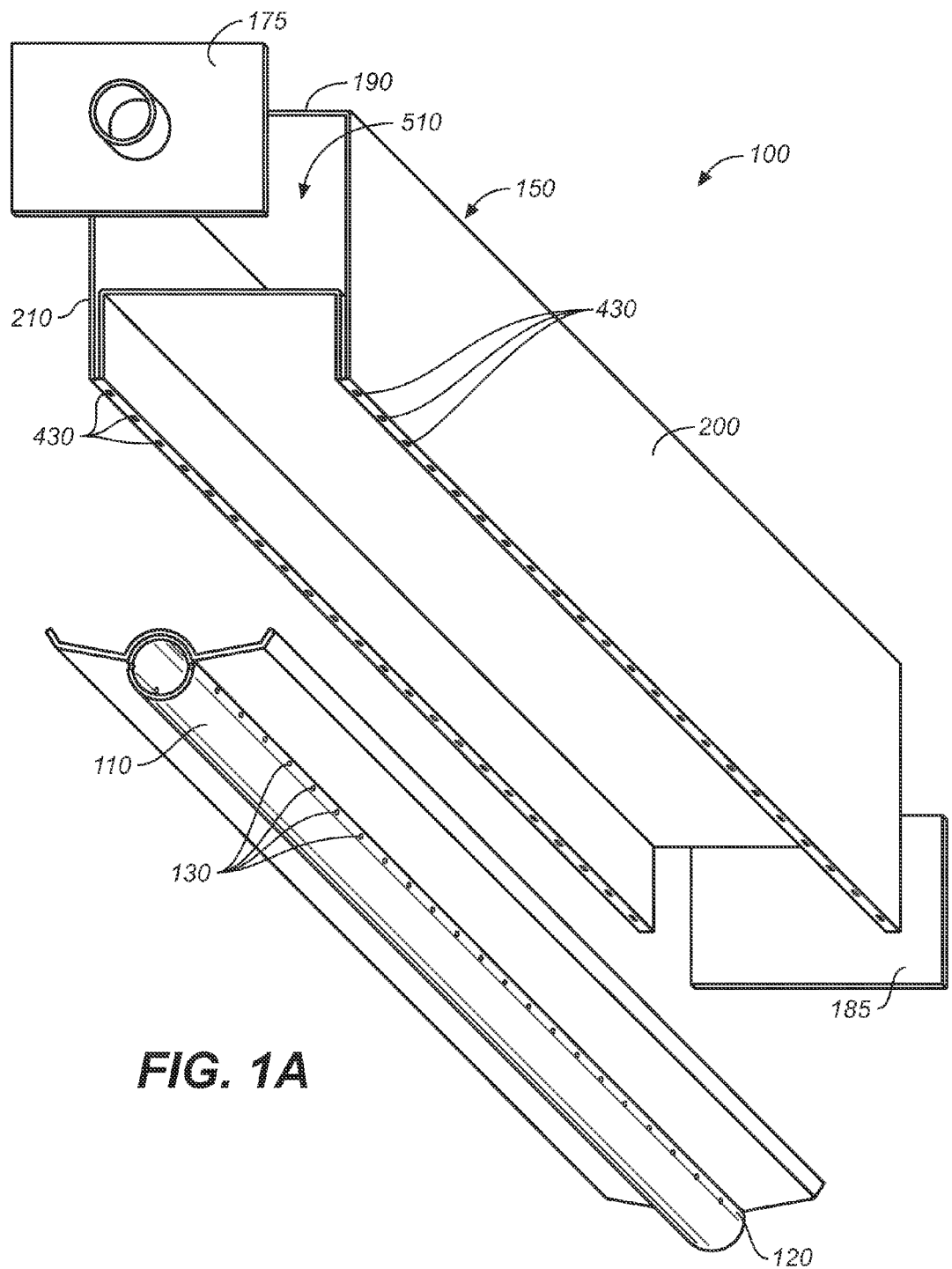
FIG. 1A is an exploded lower front end perspective view showing the general elements comprising the combined pressurized air plenum and burner of the inventive burner with the pressurized air heat and flame guide.

The following detailed description refers to the various views so as to set out the preferred modes of practicing the invention.

DETAILED DESCRIPTION OF THE INVENTION

Referring first to FIGS. 1-4 illustrate the general structural and operative elements of the first preferred embodiment 100 of the inventive apparatus. In its most essential aspect, the invention comprises, in the first instance, a heating element, which in a first preferred embodiment is a cylindrical pipe 110, having a first and second generally linear and parallel arrays 120 (second not shown) of gas orifices 130 on each side of the lower portion of the pipe. As noted previously, the orifices need not be linear or parallel and may be disposed in any of a number of suitable configurations along all or only a portion of the burner—i.e., in a staggered orientation, in spaced apart clusters or groups of two or three orifices, and so forth. The gas pipe is in fluid communication with a gas fuel source 140 (FIG. 3B).

Next, the gas burner system includes an air plenum 150/152 in communication with a source 160 (FIG. 3B) of pressurized air that provides outside air (relative to the cooking chamber) through an air inlet pipe 170. In a first preferred embodiment (FIGS. 1B, 5A, and 5B), the air plenum 152 includes three principal structural elements, the first comprising an upper channel 180 which is substantially an inverted U-shaped length of formed stainless steel. The upper channel includes a top side 190, a right side 200 having an interior surface 210, and a left side 220 having an interior surface 230, and right and left lower edges 240, 250.

Figure 1B:
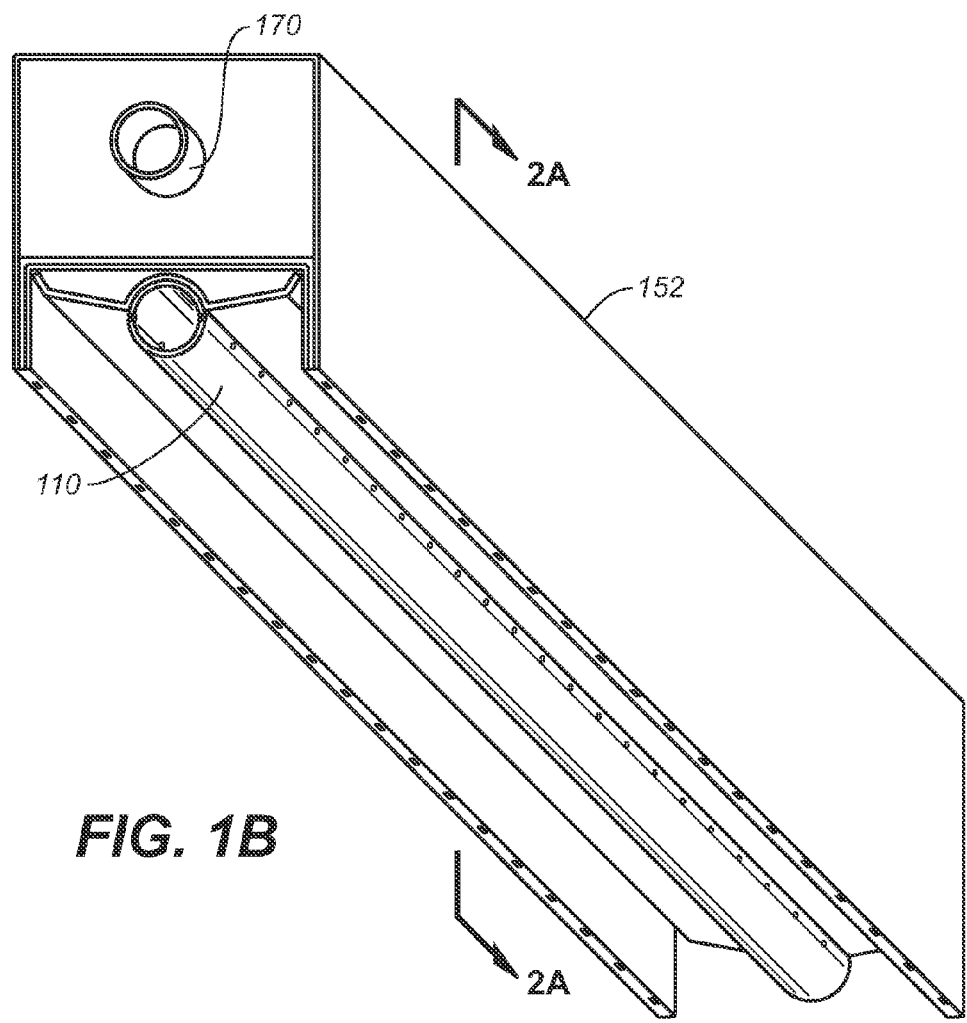
FIG. 1B is a lower front end perspective view showing the elements of FIG. 1A in the assembled configuration.

Next, and referring still to FIGS. 1B, 5A-B), the air plenum includes a lower inverted U-shaped channel 260 having an upper side 265, and right and left sides, 270, 280, each having exterior surfaces 290, 300, respectively, and right and left lower edges 310, 320.

Referring next to FIGS. 5A through 8, shown interposed between the upper channel and the lower channel are right and left L-shaped nozzle plates 330, 340. These plates may comprise separate channels, as shown in FIG. 5B, or comprise the downward right and left bends in a unitary U-shaped channel 335 (FIG. 5A). In either case, the nozzle plates each include an exterior side 350, 360 and an interior side 370, 380, right and left lower edges 390, 400, and an array of nozzles 410, which are orifices cut into the plates and shaped to accelerate air flow from the upper portion 420 of the nozzle to the outlet 430. The orifice cut extends across and along the bend line 440 generally running longitudinally along the midline the nozzle plate. As such, the air volume inside the air plenum is in fluid communication with the outside atmosphere through the upper portion of the nozzle orifices and the nozzle outlets. In manufacture, the bend is formed after the nozzles are themselves formed for ease of manufacture.

The nozzle shape can be varied according to the fluid flow characteristics desired, and tests to date have shown utility in generally oval shaped nozzles (FIG. 6). However, and referring now to FIG. 5A, a suitable alternative design 450 may include a hemispherical upper portion 460 and a funicular lower portion 470; or, now referring to FIG. 6B, a nozzle 480 having an arched upper portion 490 and a V-shaped lower portion 500.

Referring next to FIGS. 2A and 2B, in a second preferred embodiment of the present invention, the air plenum 150 includes integral upper and lower U-shaped channel portions 180, 260, respectively. They are formed from a single sheet of metal, thus obviating the need for nozzle plates. Instead, bends 245, 255 at each of the lower right and left sides form right and left narrow air gaps or troughs 512, 514, through which air from the plenum 510 will pass for discharge through the linear array of air outlets 430 disposed along the length of each bend.

In either of the preferred embodiments of the air plenum, end caps 175, 185, are sealingly disposed at each end of the upper and lower channels.

Referring again to FIGS. 2A and 2B, 5A and 5B, as well as FIGS. 8 and 9, in the assembled unit, the right and left exterior sides 350, 360 of the nozzle plates 330, 340 approximate and sealingly engage the right and left interior sides 210, 230 of the upper channel and the right and left exterior sides 290, 300 of the lower channel 260 approximate and sealingly engage the right and left interior sides 370, 380 of the nozzle plates. The lower edges of each plenum element are aligned to form a plane. Accordingly, the interior air volume 510 of the air plenum is brought into fluid communication with the surrounding atmosphere through the nozzles, and when pressurized air is delivered into the air plenum, an air flow pattern 520 is formed that is well adapted for guiding and focusing heat and flames downwardly and toward cooking food product disposed on either a stationary or moving surface below.

To further enhance cooking efficacy, the inventive apparatus may optionally include a wing or shroud 530 interposed between the gas burner pipe 110 and the underside 540 of the lower channel 260. This shroud complements the underside of the air plenum to function as a radiant heat reflector cap and comprises a medial channel portion 550 which is disposed over the top portion of the gas pipe. Angling from the edges of the channel portion are generally symmetrical wing elements 560, 570, which curve at their outboard ends 580, 590 (upwardly for shrouds on upper burners and preferably downwardly for lower burners). The curvature is initiated slightly above the level of the top of the gas burner element. This configuration helps to shape and control the shape of the flame and/or heat cone 600, but more importantly maximizes the production of radiant heat. Simultaneously, the moving air ejected from the air orifices in the plenum troughs creates an air guide or pair of focused forced air curtains 610, 620. This air curtain borders the flames on both sides and directs and focuses the flame and heat cone toward the food product moving on a cooking system conveyor.

It will be appreciated by those with skill in the art that the above-described wing or shroud may be dispensed with entirely and the air plenum itself may provide a significant and sufficient amount of radiant heating. Indeed, the downwardly depending trough portions of the plenum facilitate the focus and direction of radiant heat downwardly toward the food product. The shroud is provided to augment the radiant heating provided by the air plenum underside.

Figure 3A:
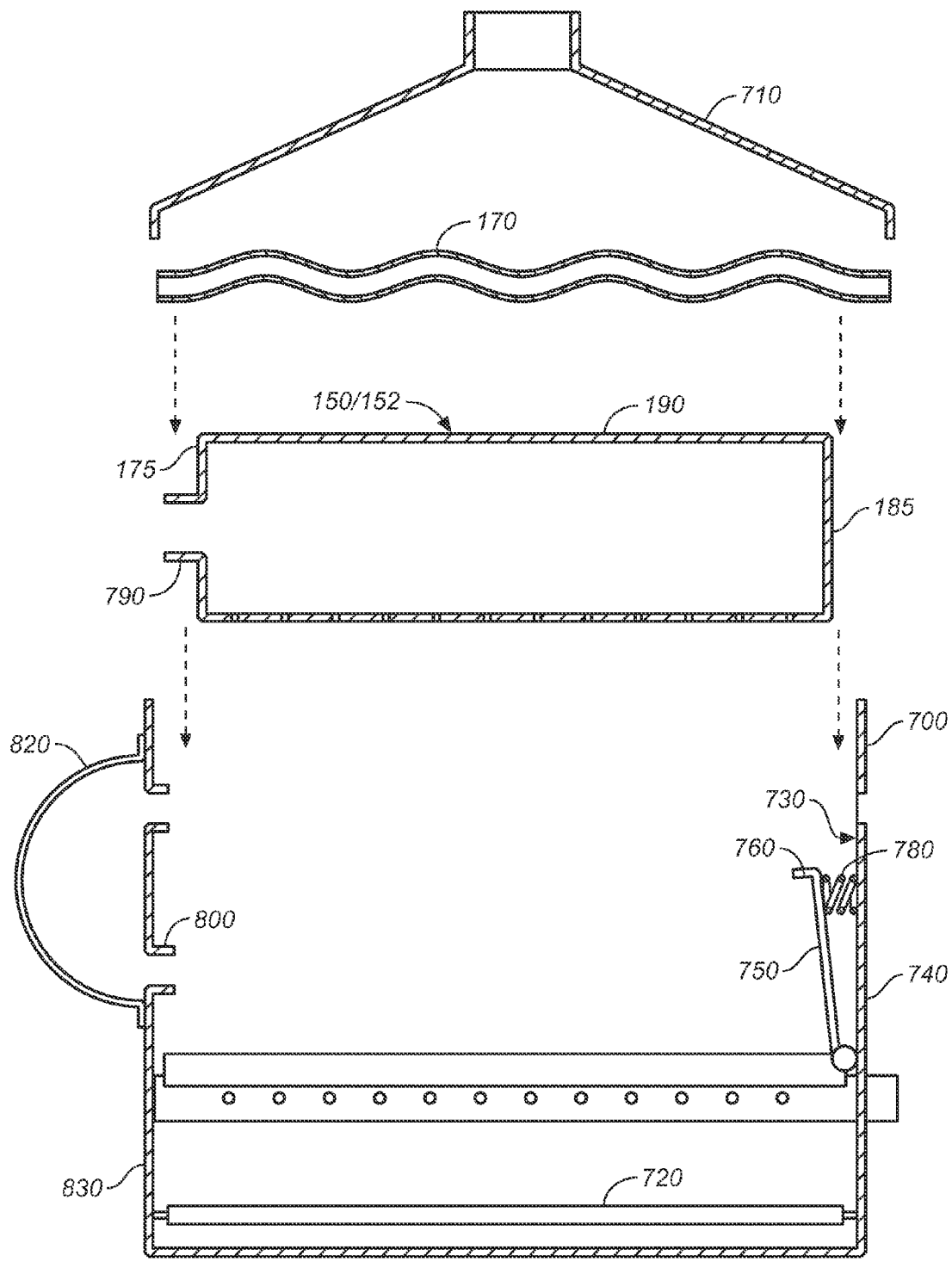
FIG. 3A is an exploded cross-sectional side view in elevation showing the elements of a complete broiler system using the inventive burner and pressurized air heat and flame guide of the present invention.
Figure 3B:
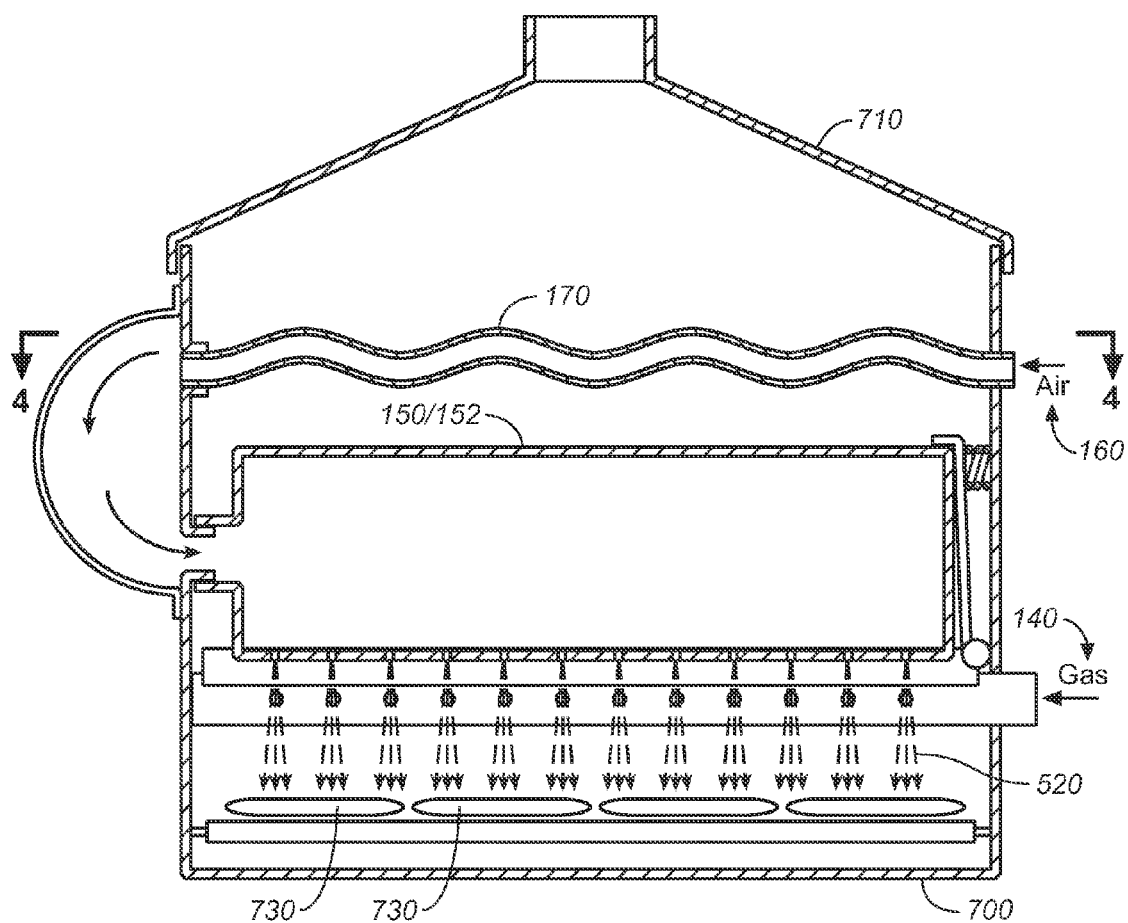
FIG. 3B is a cross-sectional side view showing the elements of FIG. 3B assembled.
Figure 4:
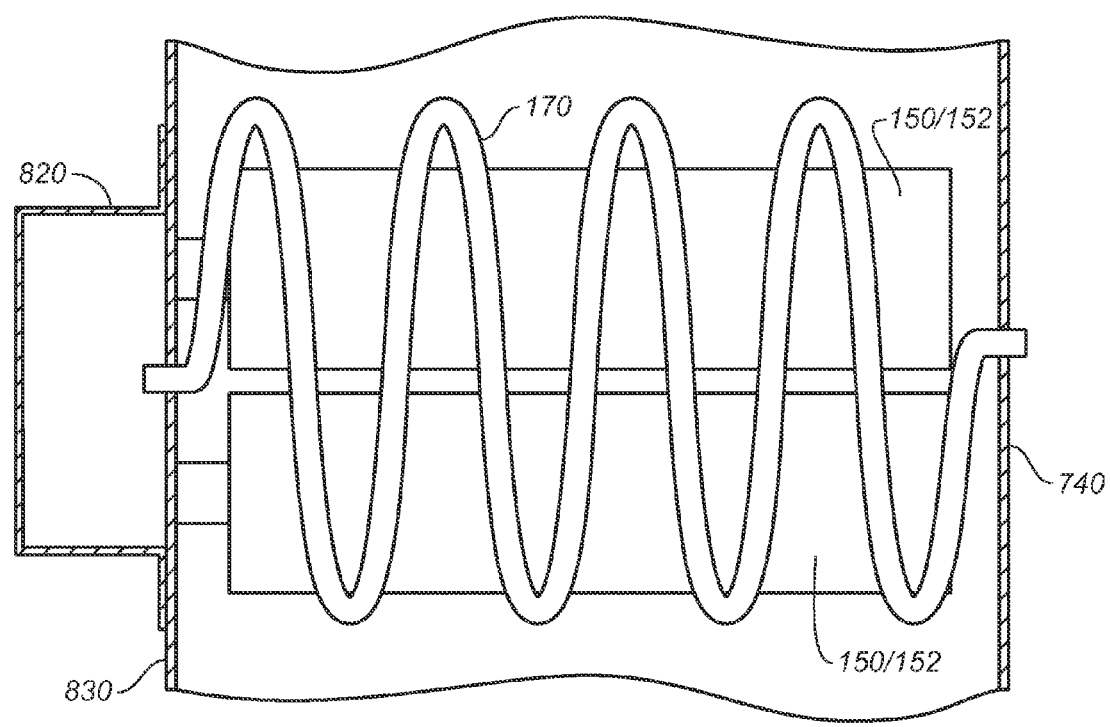
FIG. 4 is a cross-sectional top plan view thereof taken along section line 4-4 of FIG. 3B.

Referring next to schematic drawings FIGS. 3A through 4, when incorporated into an assembled broiling or cooking unit, the inventive apparatus is best implemented with snap in modular elements that facilitate cleaning and element replacement. Specifically, the system includes a housing base 700 and hood 710 which together define the cooking chamber (i.e., the cooking system interior volume). A product conveyor 720 is disposed in the lower portion for moving food product 730 from the cooking system housing front side, or inlet end of the system to and through the cooking system housing back side, or outlet end. It will be appreciated that in many cooking systems, there are burner or heating elements located below the moving food product as well as above the product, but the views shown herein are simplified to highlight the inventive features of the pressurized air system and heat/flame guide.

Pivotally attached to the interior side 730 of the cooking system housing right side 740 is a spring biased panel 750 having an upper finger 760 that engages the upper side 190 of the air plenum 150/152 when the latter is snapped into place in the cooking system. The spring 780 urges the plenum forward toward the front side of the cooking system so as to place a pipe 790 extending from the front end cap 175 into sealed connection with an air manifold pipe 800. Air from an air source 160 is conveyed through a heat exchange pipe 170, which is preferably disposed in a serpentine configuration in the upper portion of the cooking system so as to become preheated by heat from the burner elements [best seen in FIG. 4]. The pipe configuration may be varied according to the fluid flow characteristics of pressurized air through the pipe, the volume available for preheating, and the amount of preheating desired. A coiled or spiral rather than serpentine configuration, for instance, may be desirable. Heated air can also be drawn from the cooking chamber and then inserted back to the air plenum. Methods of this recirculation include blowing the heat back into the air plenum with one or more fans or inducing the heated air back into the pressurized plenum using a venturi injection system. The preheated air is introduced into an air manifold 820 attached to the left side 830 of the cooking system and through which air may be introduced into a plurality of air inlets and air plenums, the latter which may be disposed in a side-by-side relationship along the length of the cooking system interior. In this manner, the air plenums can be removed by grasping the cuboid device and pushing the spring biased panel backwards to disengage the plenum pipe 790 from the manifold pipe 800.

Figure 10:
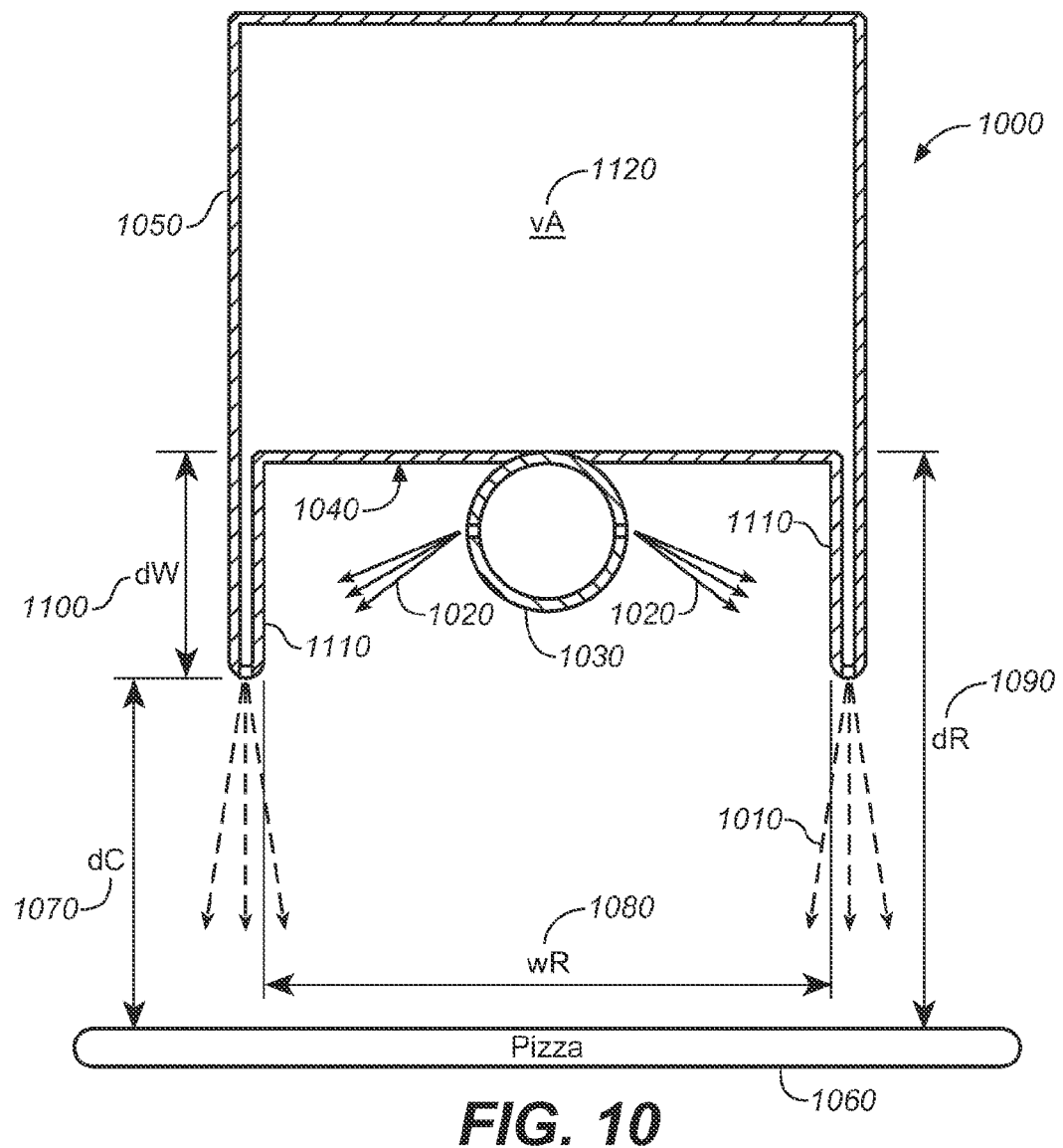
FIG. 10 is a schematic cross-sectional end view in elevation showing the functional elements of the inventive system and highlighting the operative principles.

Referring now to FIG. 10, there is shown in a schematic cross-sectional end view the essential functional elements of the inventive system 1000 and highlighting its operative principles. This schematically distills the invention down to its essence for one possible configuration and combination of heating element and air plenum configuration. This shows that there are two principal sources of heating: (1) focused forced-convective heating primarily from air jets 1010 and secondarily from heat and/or flames 1020 from one or more heating elements 1030; and (2) radiant heat from the bottom surface 1040 of the air plenum 1050.

The influence of the focused forced-convention heating on food product (shown here as a pizza pie 1060), will depend on the volume and velocity of the forced air, the temperature of the forced air, and the distance 1070 to the food. The influence of radiant heat will depend on the temperature of the bottom surfaces of the plenum and burner, the width of the radiant area 1080, and the distance 1090 as measured from the radiant are to the food. Some foods will call for a higher proportion of convective heat in relation to radiant heat. Other foods may call for a higher proportion of radiant heat at the end of the cooking process in order to optimally finish the cooking. Accordingly, the length 1100 (1090 minus 1070) of the plenum wings 1110, will be tailored to achieve the desired proportion of radiant to convective heat.

The volume of air, vA 1120, of the air plenum can be varied according to the ideal length of time air should remain in the plenum before being ejected from the air nozzles. As illustration of this an air supply of 5 cfm has been found to be a suitable pressure for providing air that remains in the plenum for 8-10 seconds before ejection for a 16-24 inch long burner system. Other configurations, including the size of the air plenum 1120 will depend on the desired cooking performance and amount of heated air needed for recovery during high load-quantity cooking or for recovery time of a cooking system with an energy management system in energy savings or hibernation mode.

Figure 11:
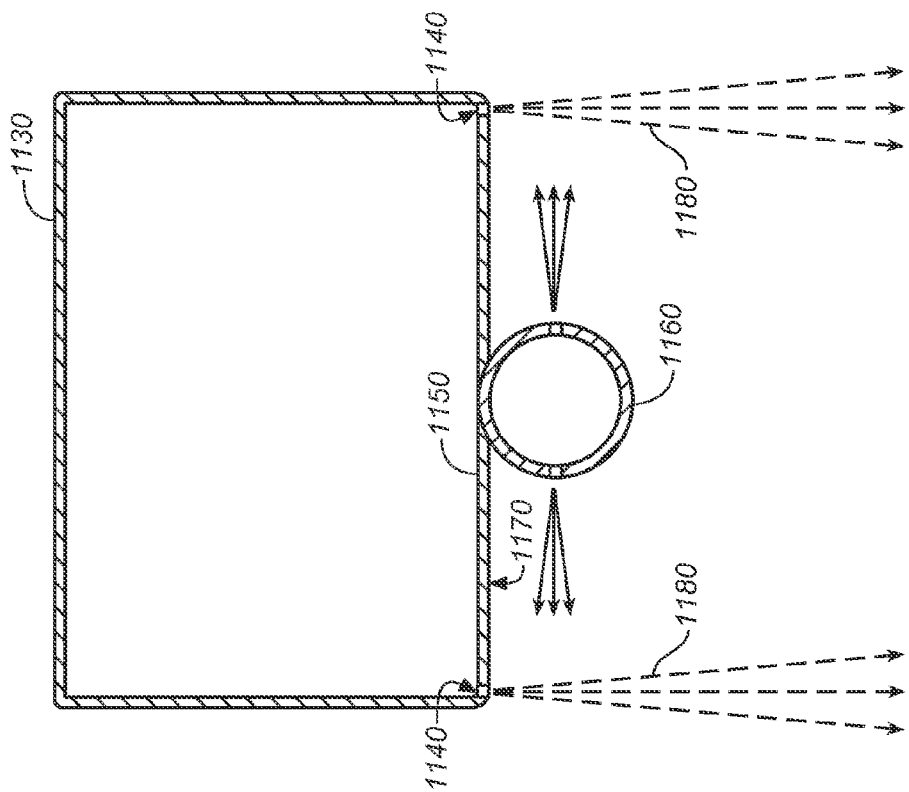

FIGS. 11-14 are each schematic cross-sectional end views in elevation showing alternative plenum configurations and air outlet arrays (here shown for use with gas burners.) FIG. 11 shows an embodiment in which the plenum 1130 is essentially square or rectangular in cross section and does not include wings, as shown in FIG. 10. Rather, the air outlets 1140 are disposed in the bottom side 1150 of the plenum and straddle the sides of the burner 1160, which is disposed proximate the bottom surface 1170 of the bottom side of the plenum. This produces an air curtain 1180 on both sides of the heating element.

Figure 12:
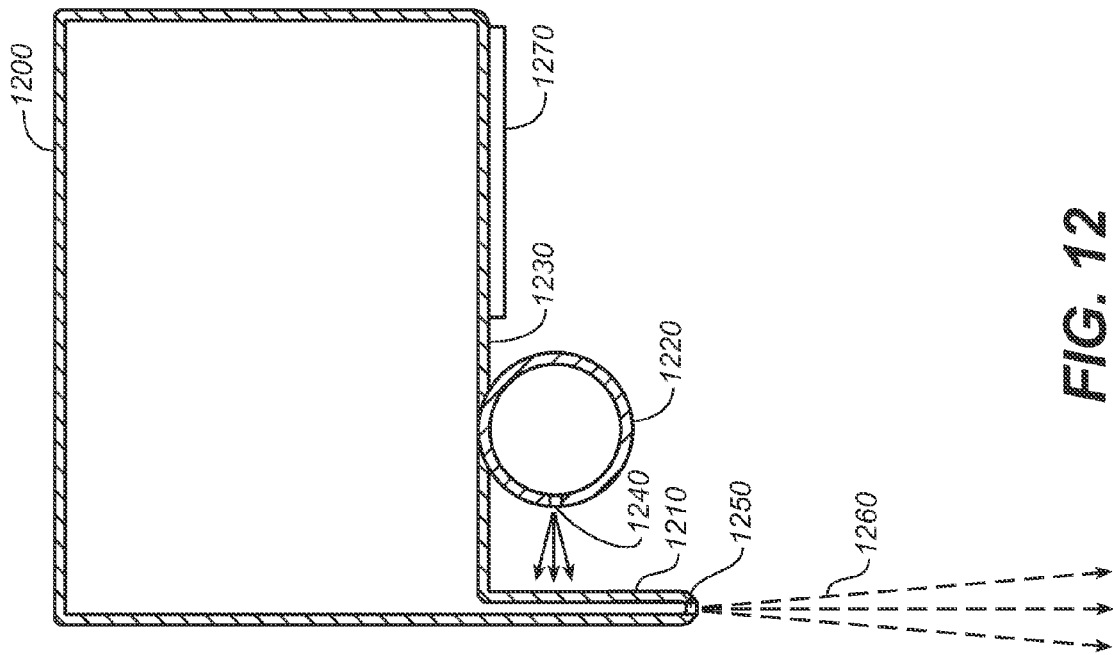
FIGS. 11-14 are each schematic cross-sectional end views in elevation showing alternative plenum configurations and air outlet arrays for use with one or more gas burners.

FIG. 12 shows a plenum 1200 having a single wing 1210 disposed on one side of a burner element 1220 proximate the bottom surface 1230 of the plenum. This design is also applicable for use with electric heating elements. The burner may have gas outlets 1240 on only one side and orientated so as to face the wing, though outlets elsewhere may be provided, as well. The single wing with air nozzles 1250 provides a single air curtain 1260 on only one side of the heating element. Such burner/heating element design allow for an additional radiant heating section (right of 1230).

Figure 13:
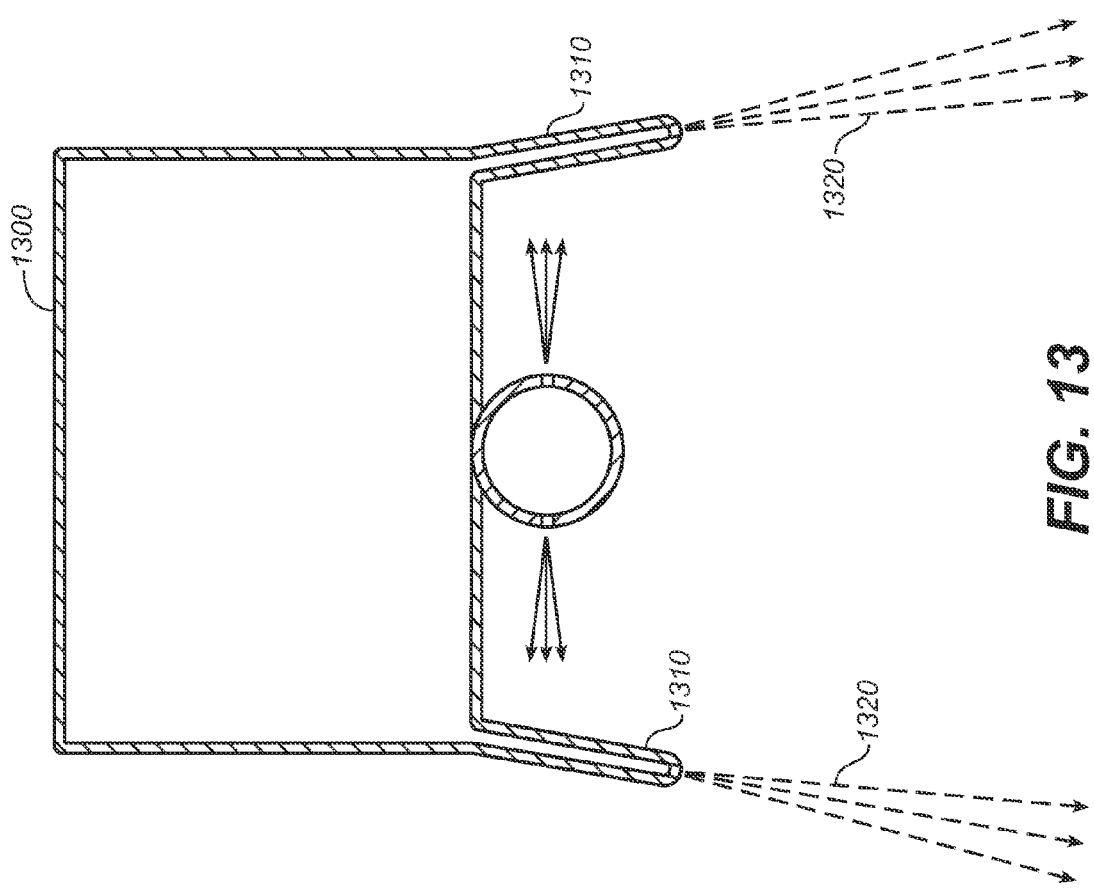

FIG. 13 shows another embodiment in which the air plenum 1300 has one or more outwardly angled wings 1310 (here shown outwardly), such that the air curtain is produced by jets 1320 that are alternately directed (here outwardly).

Figure 14:
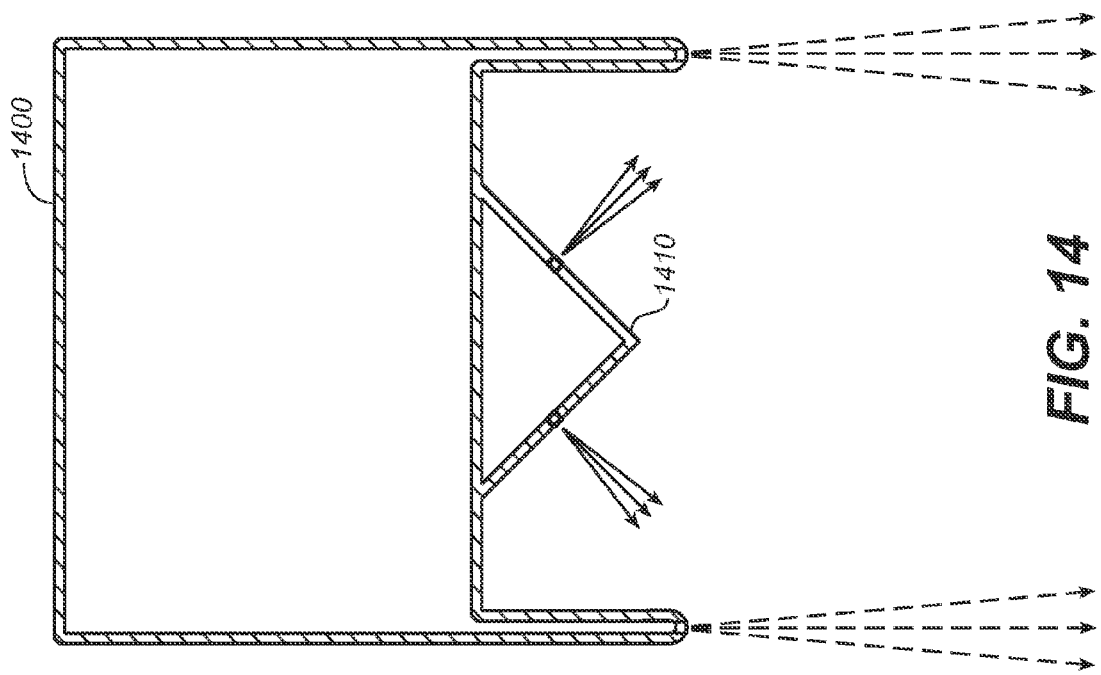

FIG. 14 shows yet another embodiment having the plenum 1400 of the first preferred embodiment, but in which the burner element 1410 is triangular, rather than circular, in cross section. Alternately, other geometric forms for the burners are possible—square, rectangular, and so forth.

Figure 15:
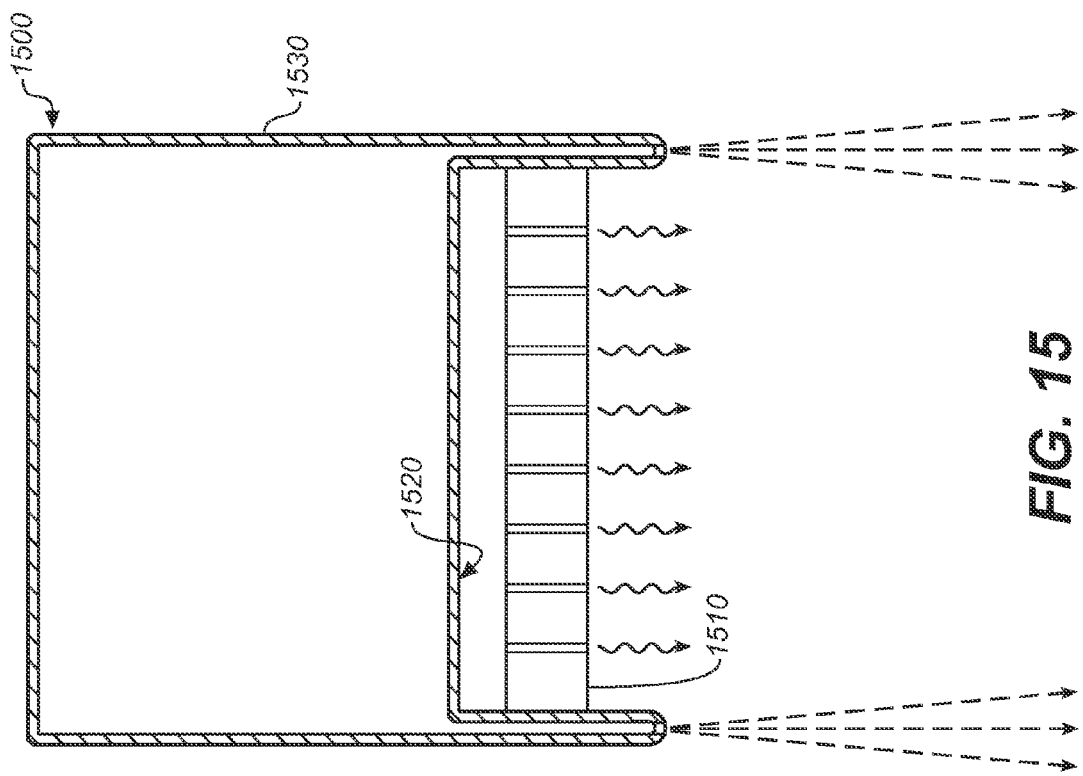
FIG. 15 is a schematic cross-sectional end view in elevation showing the same plenum configuration and air outlet array as that of FIGS. 2A and 2B, but combined with one or more infrared heating elements.

FIG. 15 shows still another embodiment 1500 in which an infrared heating element 1510 is provided on the underside 1520 of the plenum 1530.

Figure 16:
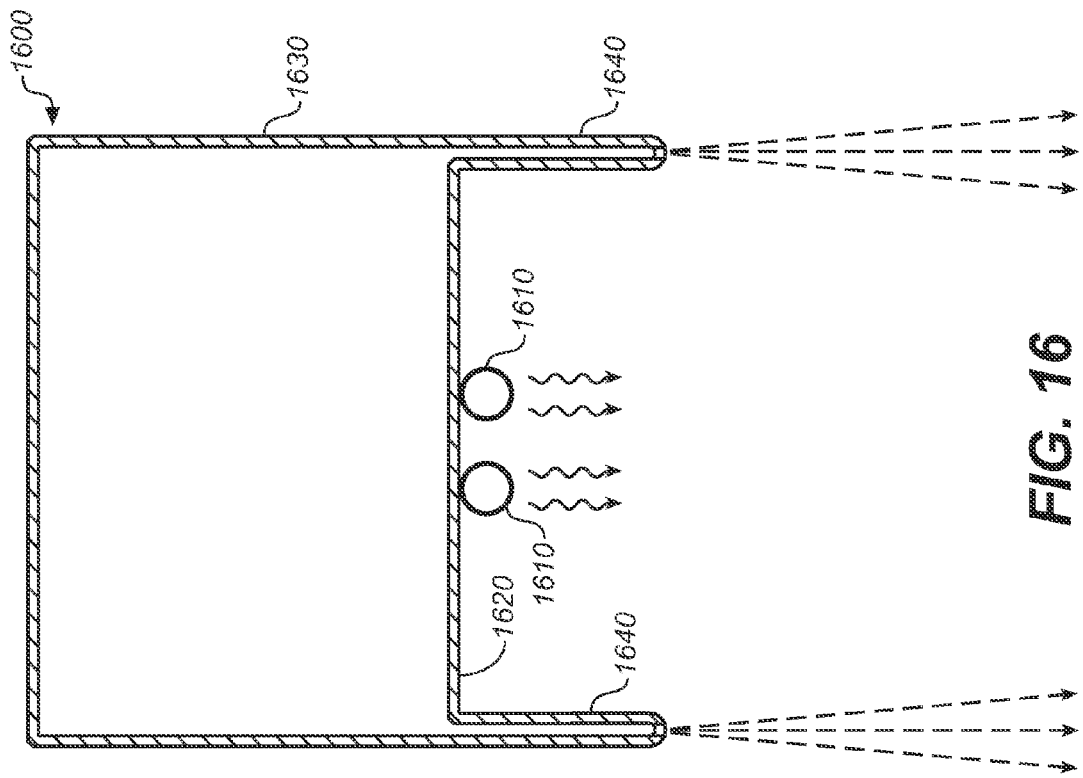

FIG. 16 is still another embodiment 1600 having side-by-side parallel electric resistance heating elements 1610 disposed on the underside 1620 of an air plenum 1630 with wings 1640. This figure shows two heating elements, but singles or multiples are possible.

Figure 18:
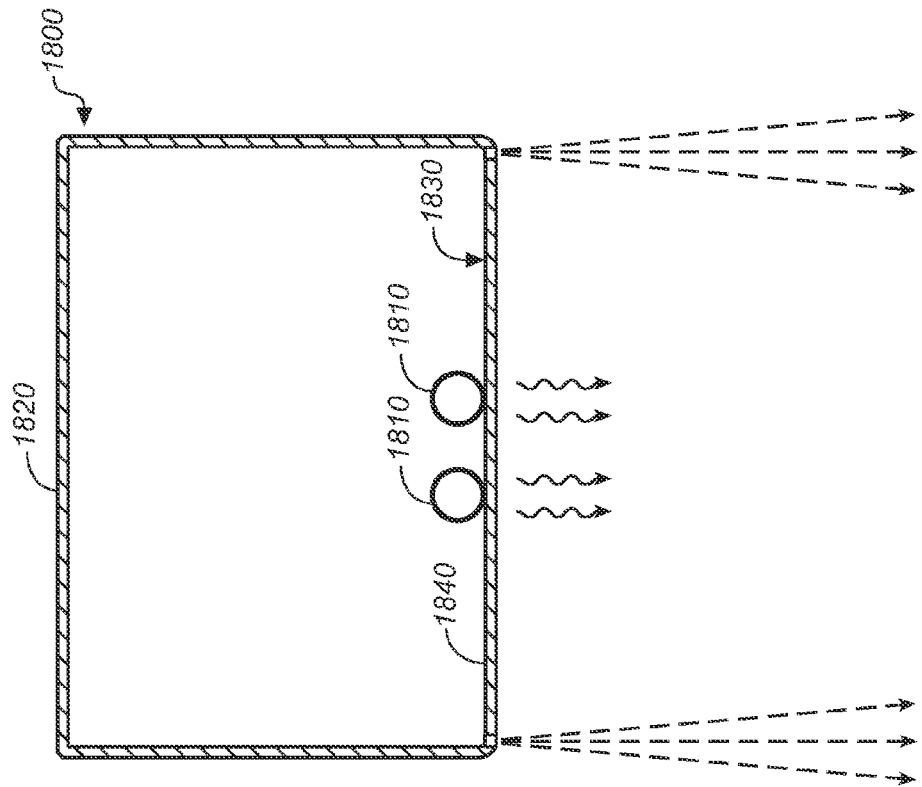
Figure 17:
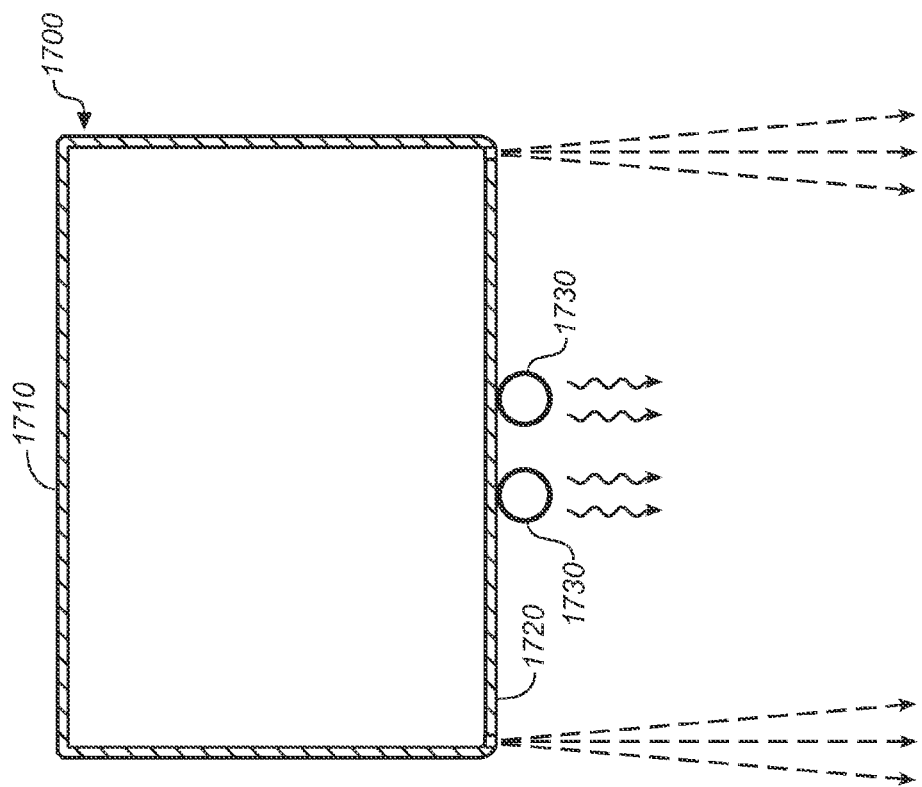

FIG. 17 shows a variation 1700 in which the air plenum 1710 has a flat bottom side 1720 with no wings and side-by-side parallel electric resistance heating elements 1730 (two shown, multiple or single possible) disposed under the bottom side. In yet another embodiment 1800, FIG. 18, the same apparatus is provided with electric heating elements 1810 disposed within the air plenum 1820 and proximate the top surface 1830 of the bottom side 1840 of the plenum. In this configuration, the heating element will directly heat the air in the air plenum.

FIG. 19 shows another embodiment 1900 in which the air plenum 1910 is provided with an integral enclosure 1920 of triangular cross section on its bottom side 1930 and in which heating elements 1940 are disposed. Other geometric forms are possible.

FIG. 20 shows still another embodiment 2000 in which the air plenum 2010 includes wings 2020, each having an upwardly angled panel 2030 defining a space 2040 in which at least one heating element 2050 is disposed.

Figure 21:
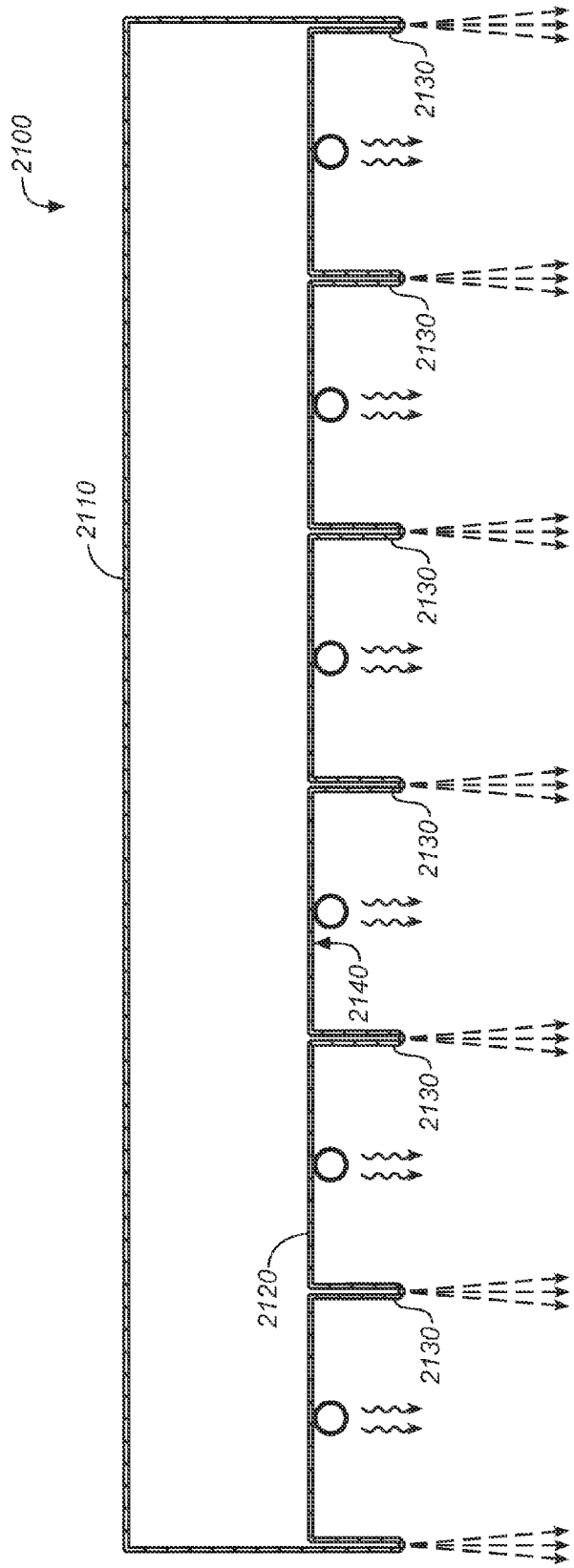
FIG. 21 is a cross-sectional side view in elevation showing a single/combined plenum with an air outlet manifold disposed on its underside for use with one, two or more gas burner and electric heating elements (shown with electric heating elements)

FIG. 21 is an alternative embodiment 2100 having an air plenum 2110 with an air outlet manifold disposed on its underside 2120. The manifold comprises a plurality of parallel wings 2130 integrally formed in the bottom side of the plenum. According to this embodiment, a plurality of air curtains are formed around a plurality of heating elements, each disposed proximate the bottom surface 2140 of the bottom side of the plenum. This embodiment would allow the use of angled wings or no wings, multiple burners and heating elements and so forth, as described above.

Figure 22:
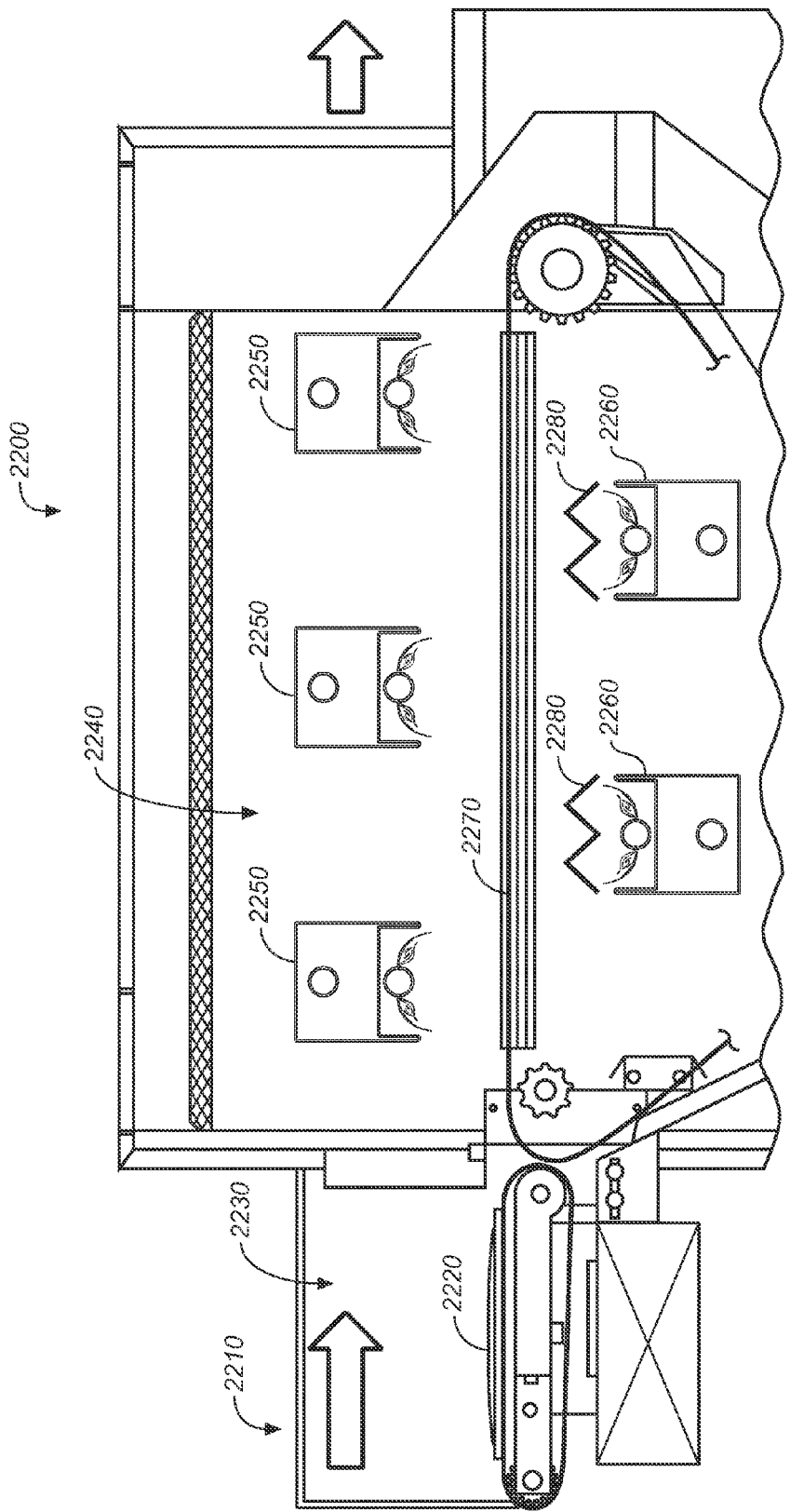
FIG. 22 is a cross-sectional side view in elevation of a possible burner/plenum configuration installed in a multi-stage conveyor oven using magnetic induction, convection and radiant heat whereas upper and lower burners or heating elements can be installed on top of each other or off-centered (shown gas burners off-centered)

FIG. 22 is a cross-sectional side view in elevation of a possible heating element and pressurized air plenum configuration installed in a multistage conveyor oven using magnetic induction, convection and radiant heat. This view shows a fairly typical commercial cooking platform for a fast food restaurant the prepares hamburger patties for hamburgers. This is a standard pass-through design with a single chain or spindle driving product through the cooking chamber on a stainless steel conveyor platform. Cooked product traveling in one of three or more cooking lanes is output onto a catch tray at the output end of the conveyor. The upper and lower burners or heating elements in the cooking chamber can be aligned on top of each other or off-centered (here shown as single gas burners, off-centered). The conveyor oven 2200 includes a first cooking stage 2210 utilizing a magnetic induction cooking element 2220 in the initial cooking chamber 2230. In the main cooking chamber 2240, food is conveyed underneath one or more upper air plenum/heating element combinations 2250, and over one or more lower air plenum/heating element combinations 2260, which may be generally aligned with the upper elements or offset to varying degrees. The conveyor 2270 may be protected from the lower heating elements by shrouds 2280 disposed immediately over the lower air plenum/heating element combinations.

As will be appreciated by those with skill in the art, the system described above combines three means of heat transfer, including forced convection heating, radiant heating, and convection heating. Furthermore, the system includes means of capturing and reusing heat that would otherwise be discharged as useless and environmentally damaging waste heat. Careful testing and evaluation of the above-described system demonstrate reliable and dramatic energy savings and reduced cooking time when compared with commercial systems in general use. In view of the environmental and economic advantages that follow from such savings, it is clear that the improved system of the present invention is neither anticipated nor obvious in view of prior art products.

Figure 23:
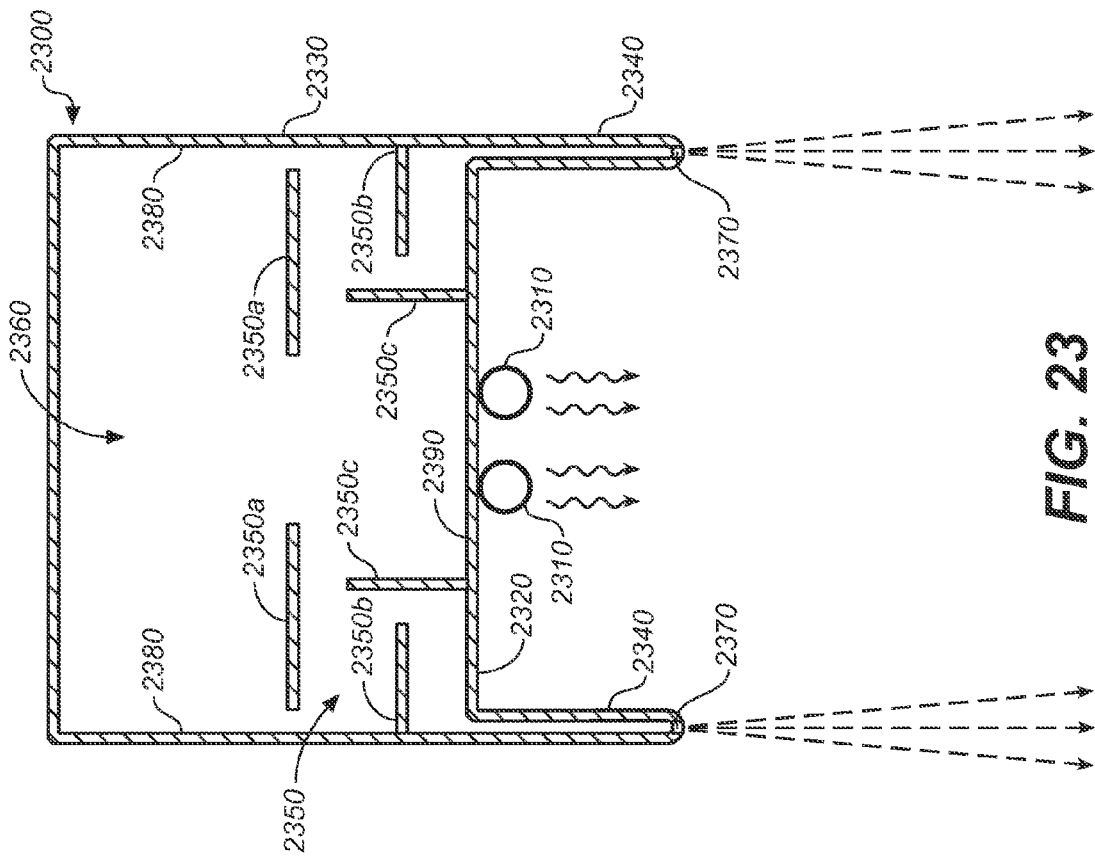
FIG. 23 is cross-sectional end view in elevation showing an alternative air plenum having an interior baffle system.
Figure 24:
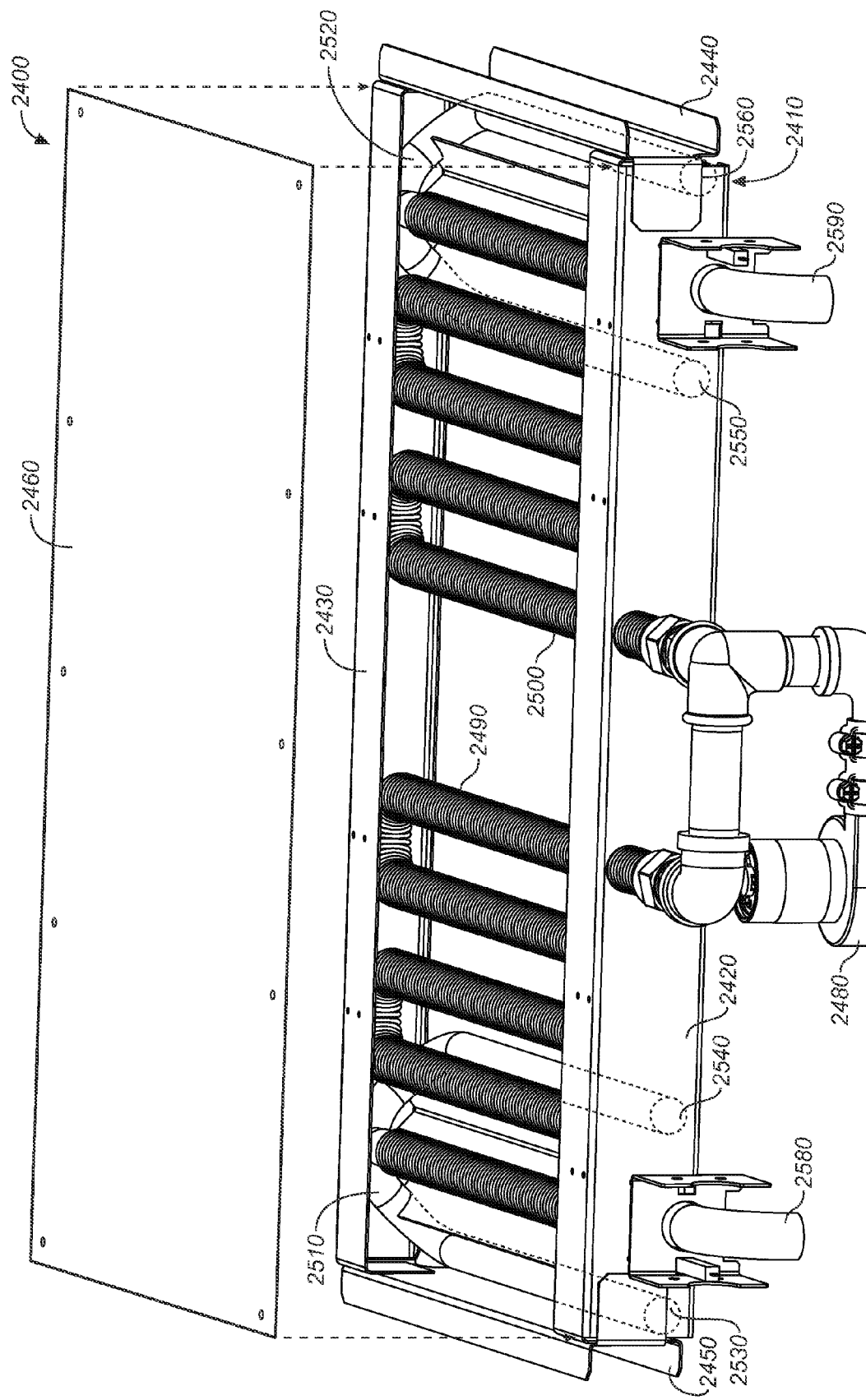
FIG. 24 is an upper front perspective view of a first preferred embodiment of the modular waste heat recovery unit of the present invention.
Figure 25:
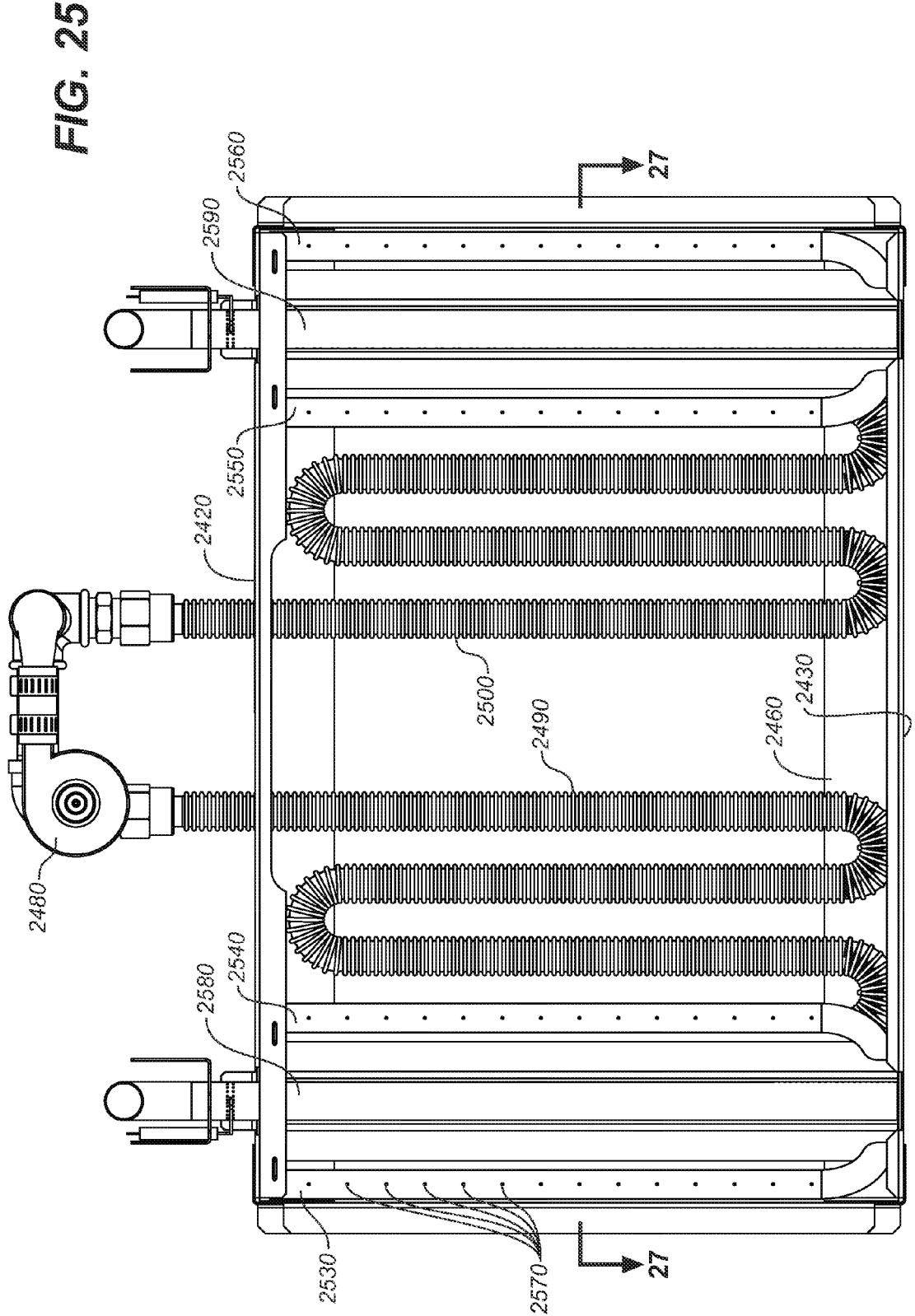
FIG. 25 is a bottom plan view thereof.
Figure 26:
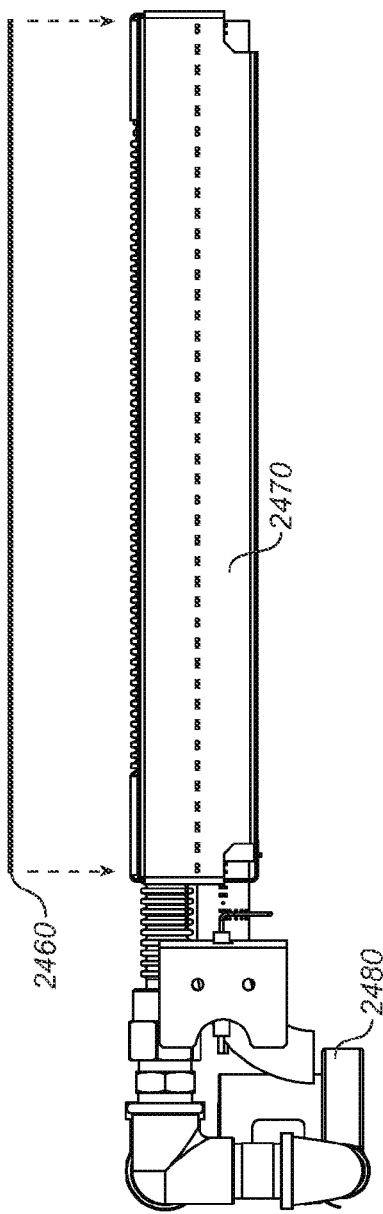
FIG. 26 is a right side view in elevation thereof.
Figure 27:
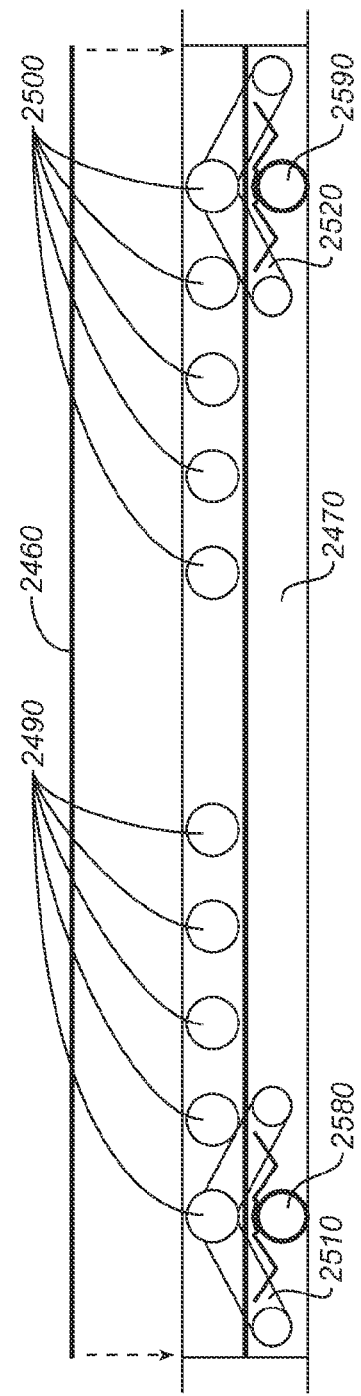
FIG. 27 is a cross-sectional front view in elevation thereof, taken along section line 27 of FIG. 25.
Figure 28:
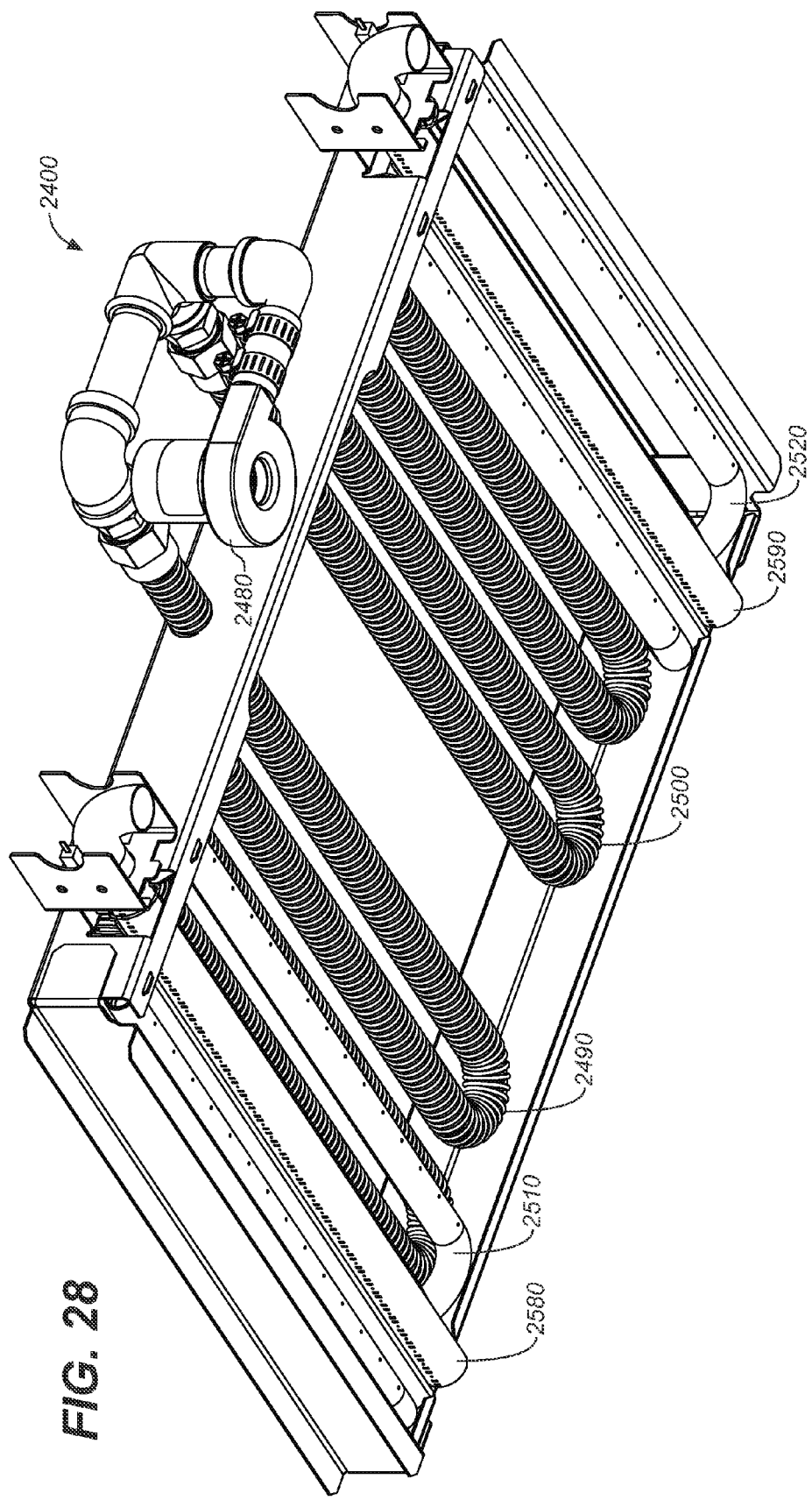
FIG. 28 is a lower front perspective view thereof.
Figure 29:
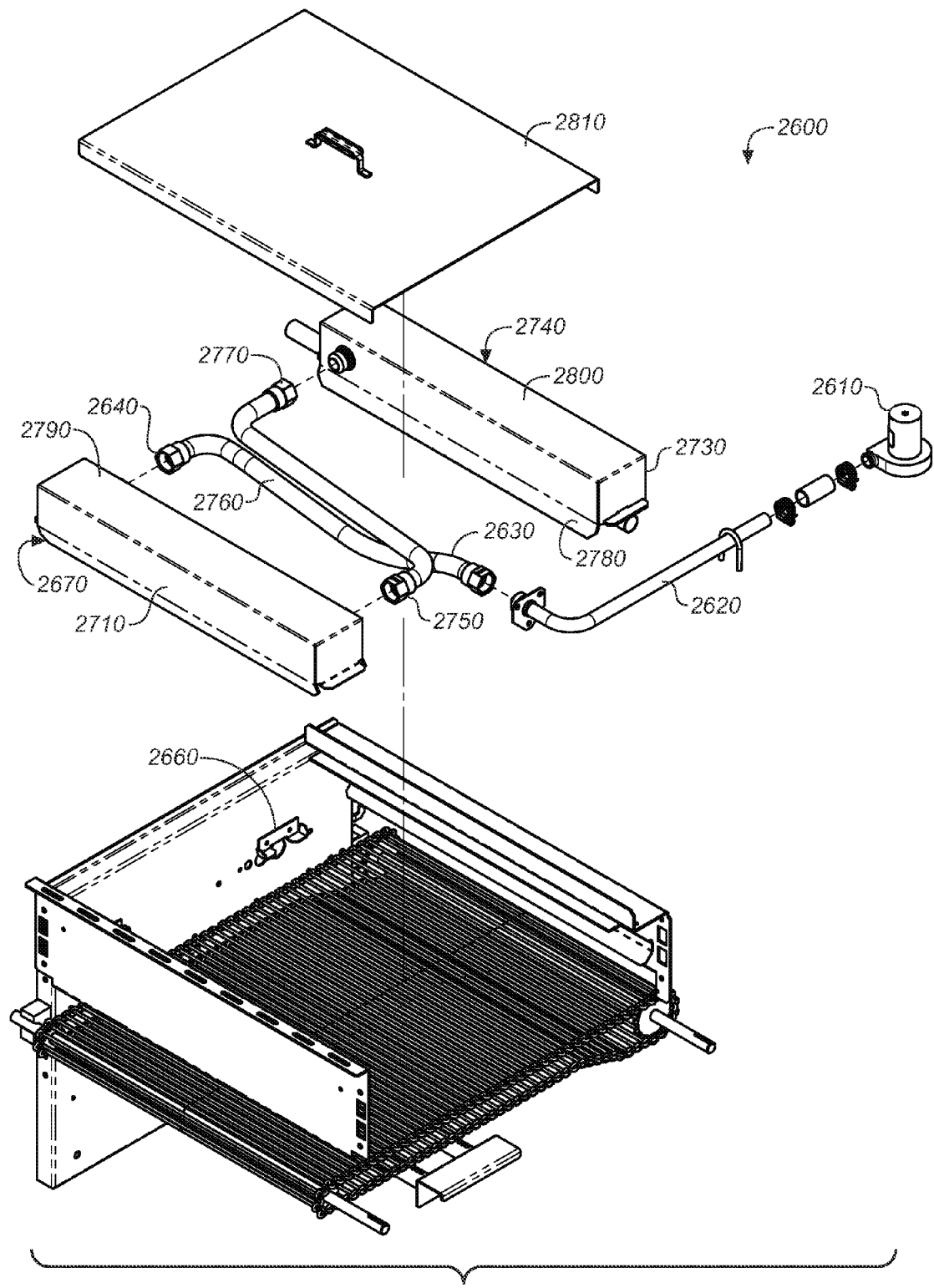
FIG. 29 is an upper front exploded perspective view of the best mode of practicing the energy saving integrated air-to-air modular waste heat recovery system of the present invention, showing this system without the front panel included.
Figure 30:
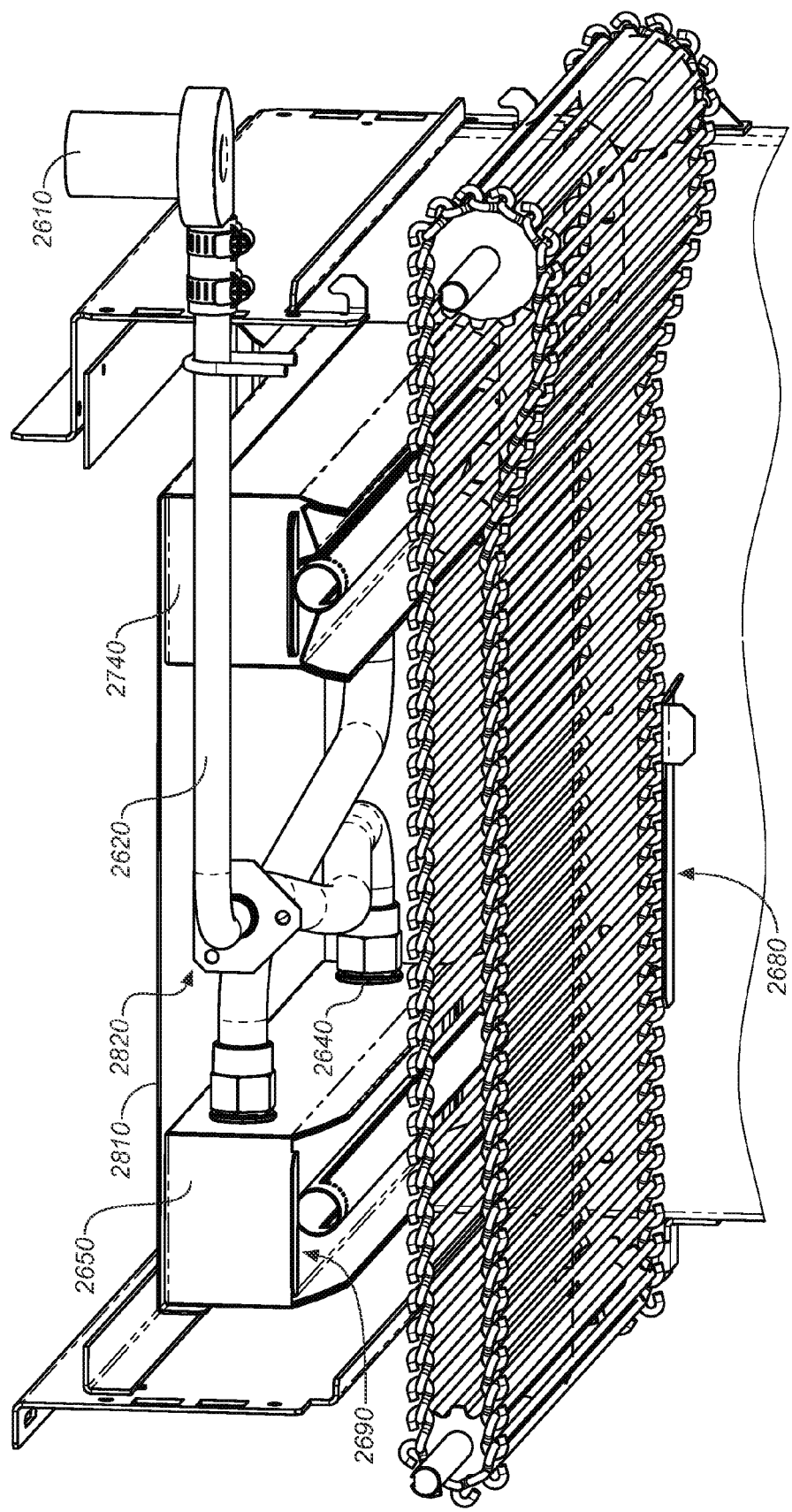
FIG. 30 is a lower front perspective view of the assembled system.
Figure 31:
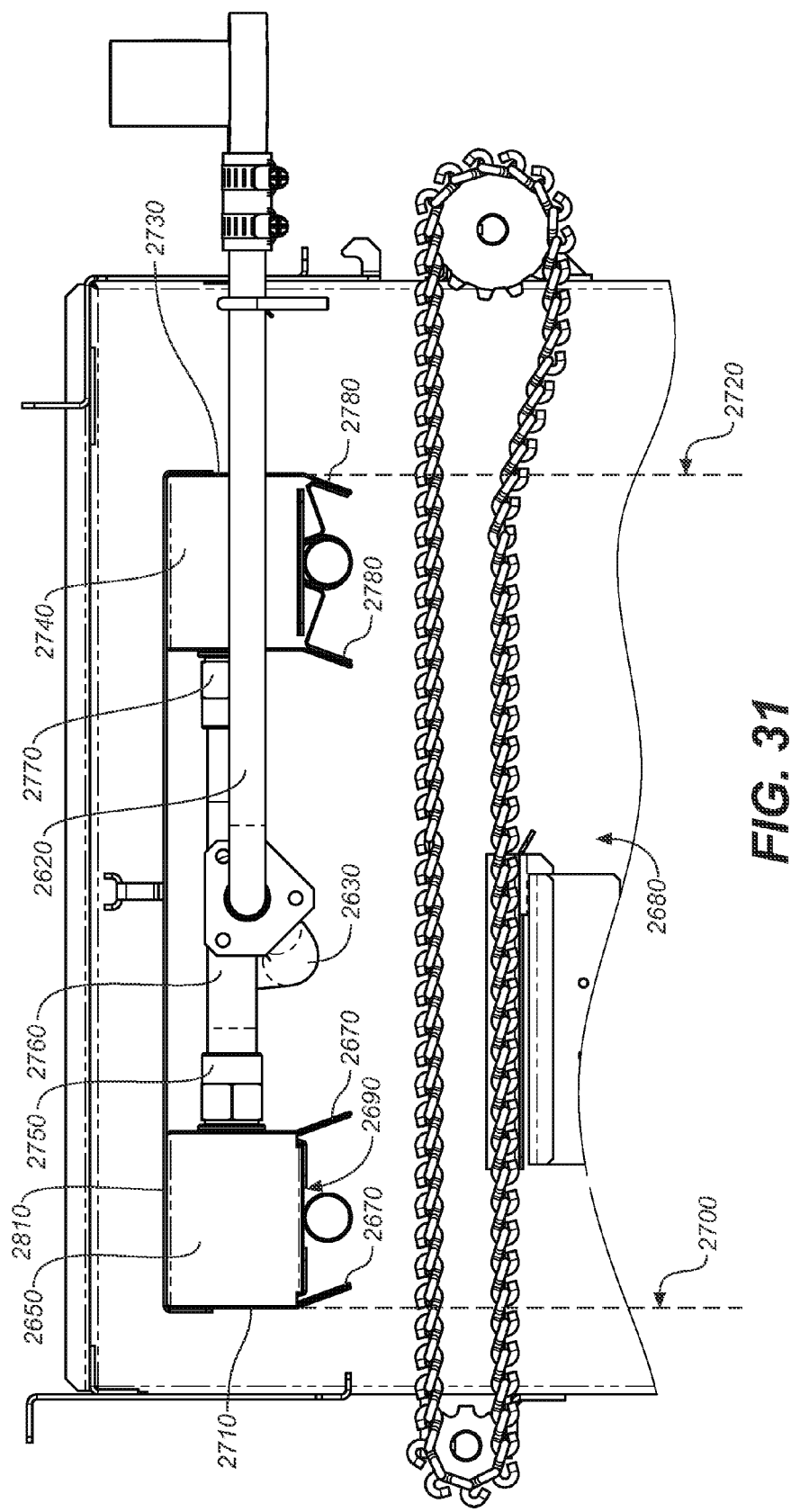
FIG. 31 is a side view in elevation thereof.
Figure 32:
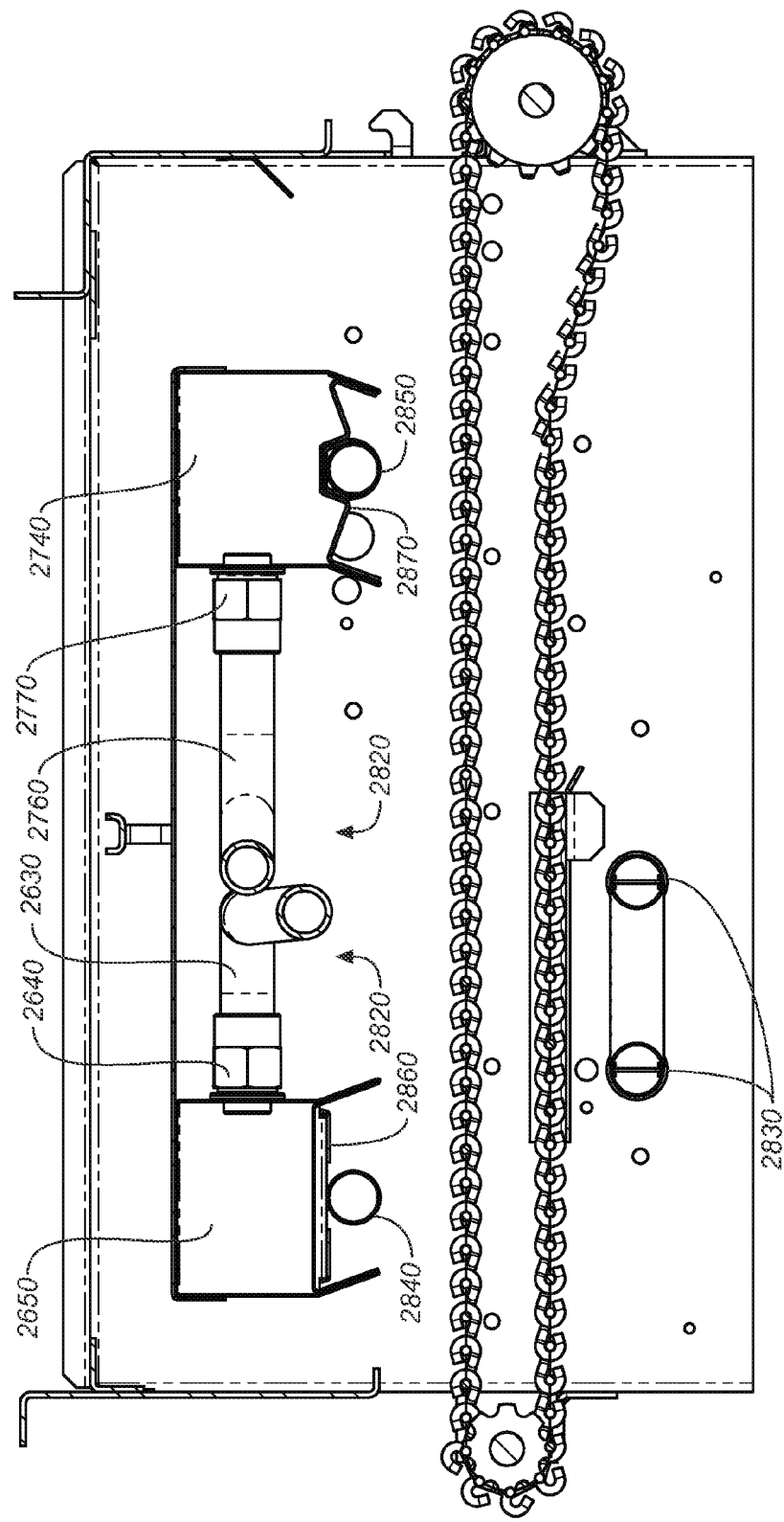
FIG. 32 is a cross-sectional side view in elevation thereof.

FIG. 23 shows yet another embodiment 2300 of the inventive system, this alternative including side-by-side parallel electric resistance heating elements 2310 disposed on the underside 2320 of an air plenum 2330 with wings 2340. This alternative further includes a baffle system 2350 disposed on the interior of one or more of the air plenums employed in the cooking system. For illustrative purposes this embodiment is shown with two resistance heating elements, but single or multiple electric heating elements may be employed, one or more gas burners may be employed, and any of the above-described plenum configurations may be employed. The baffle system impedes the direct flow of air from the interior volume 2360 of the plenum through the air outlets 2370, and thereby ensures that the air is retained in the interior volume a sufficient length of time to bring it up to a temperature suitable for its forced and focused ejection from the plenum. The baffles may include two horizontally disposed slats 2350a connected to each end plate (not shown) of the plenum, two horizontally disposed slats 2350b connected to the interior sides 2380 and end plates of the plenum, and two vertically disposed slats 2350c extending upwardly from the bottom side 2390 of the plenum. This configuration forces air to make an indirect patch from the plenum interior volume and through the spaces between the baffle slats before exiting the air outlets. Those with skill will appreciate that a suitable baffle might be configured with any of a number of different elements and configurations to provide the desired fluid flow characteristics, and such alternative designs are contemplated herein.

FIGS. 24-28 show an alternative to the heat transfer system shown in FIG. 4 and is specifically configured to function as a waste heat recovery and recycling system. In this system configuration 2400, the upper portion of the cooking chamber is a modular unit 2410 that can be removed as a unit from the cooking chamber for cleaning, maintenance, and replacement. The modular unit includes a box with a front side 2420, a back side 2430, right and left sides, 2440, 2450, a top 2460 and a dividing panel 2470. Pressurized air is fed by a blower 2480 into and through right and left sinuous runs 2490, 2500 of corrugated pipe. Each corrugated pipe terminates in a downwardly angled Y-type connector 2510, 2520, each of which then connect to spaced apart air outlet pipes, 2530, 2540, 2550, 2560, each having plurality of air nozzles or orifices 2570. The air outlet pipes straddle the burner or heating element 2580, 2590 so as to form the focused forced air curtain described above. The medially disposed dividing panel is an optional element that may be positioned above the air outlet pipes and the burner or heating element, but below the corrugated. In this manner, the panel isolates the heat transfer elements (principally the corrugated pipes) from smoke and grease in the cooking chamber and thus prevents a reduction in heat transfer efficiency resulting from the accumulation and accretion of a residue coating. However, the panel may also be removed or simply excluded at the time of manufacture when a user wishes to increase direct exposure of the heat transfer pipes to cooking chamber waste heat.

FIGS. 29-32 show another embodiment of, and the best mode identified to date for practicing, the energy saving integrated air-to-air waste heat recovery system of the present invention. This embodiment 2600 includes an assembly of elements that cooperate to provide a system that achieves remarkable and unexpected energy savings by utilizing waste heat generated in the cooking chamber to pre-heat air from a low pressure air system before it is delivered in a focused curtain down onto food product conveyed through the cooking chamber. It includes blower 2610 that provides the supply of pressurized fresh air through an air supply pipe 2620 to a first heat transfer pipe 2630, which may be plain or corrugated metal pipe. This first heat transfer pipe extends from a front portion of the upper cooking chamber to the back portion of the upper cooking chamber where it enters through fittings 2640 into a first air plenum box 2650 mounted on brackets 2660 disposed on the front side (not shown) and the rear sides, 2670 of the upper cooking walls. The air plenum is generally configured as a rectangular box, much as the embodiments described above, with wings extending downwardly from the bottom side of the box. Some of the air introduced into the first plenum thus passes through air outlets disposed at the lower ends of the wings 2670 that extend down from the bottom of the plenum. However, in this embodiment, the wings are angled inwardly at an approximate 20 degree angle (meaning inward toward the center area 2680 of the cooking chamber relative to the bottom side 2690 of the air plenum box in such a manner that the focused forced curtain of air not only disturb and break up the thin insulating layer of cold air immediately above the surface of frozen food product, but confines and constrains the hot air rising within the cooking chamber to keep it from migrating substantially outside the region defined by a vertical line 2700 extending down from the outer side 2710 of the first air plenum and a vertical line 2720 extending down from the outer side 2730 of a second air plenum 2740.

When the volume of air in the first air plenum exceeds the amount that can be forced through nozzles in the plenum wings, the excess air exits the front portion of the plenum through a fitting 2750 into a second heat transfer pipe 2760 which extends across the upper portion of the cooking chamber and past the first heat transfer pipe 2630, where it is coupled with a fitting 2770 to the second air plenum 2740. The second air plenum also has inwardly angling wings 2780 with air outlets (nozzles) that create a focused curtain of forced air. However, the second air plenum does not have any outlet pipe and air exits this plenum only through the air outlets in the wings. Accordingly, the pressure in the first and second plenums is rapidly equalized after system start up.

Disposed immediately above the top sides 2790, 2800, respectively, of the first and second air plenums is a cap or dome 2810 that further confines rising hot air and effectively traps it in the air space 2820 directly between the first and second air plenums occupied by the first and second heat transfer pipes. This hot air is waste heat generated from lower heating elements/burners 2830 and the heat generated by the upper heating elements/burners 2840, 2850 and the radiant heat from heat reflecting elements, most notably including burner shrouds 2860, 2870, and the air plenums themselves, which heat is, at least in part, initially directed downwardly by the focused forced air curtains streaming from the air plenum wings, is at least temporarily captured and retained in the space between the plenums until its kinetic energy is sufficient to overwhelm the confining force provided by the curtain of focused forced air exiting the air plenums and thus to spill out from underneath the air plenums for venting to the outside atmosphere through the cooking exhaust system, typically including a hood and a flue. The dome preferably comprises a generally planar stainless steel panel that spans across the top sides of the air plenums and extends from the front side of the cooking chamber to the back side of the cooking chamber, thereby effectively preventing rising hot air from escaping between the air plenums and into the uppermost portion of the cooking chamber. Accordingly, the dome, air plenums, and air curtains collectively form a kind of baffle system that facilitates the transfer of waste heat from cooking chamber air to first and second heat transfer pipes and the air plenums and thereafter to the air in the forced air system. Accordingly, the air in the low pressure forced air system is dramatically heated before being directed down toward the food product and its use in creating the confining air curtain. In several installed systems, the temperature of the air existing the plenum wings has been measured at between 450° and 850° F.

Figure 33:
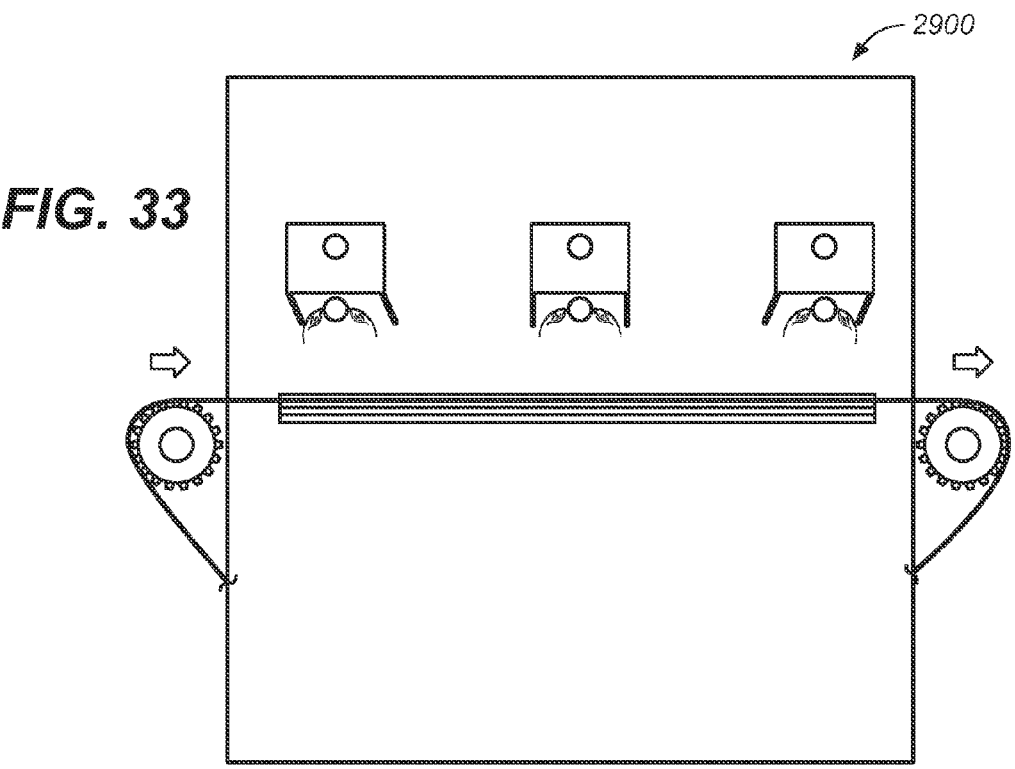
FIG. 33 is a schematic side view in elevation of a standard platform conveyor broiler including the air plenum and burner elements described above.
Figure 34:
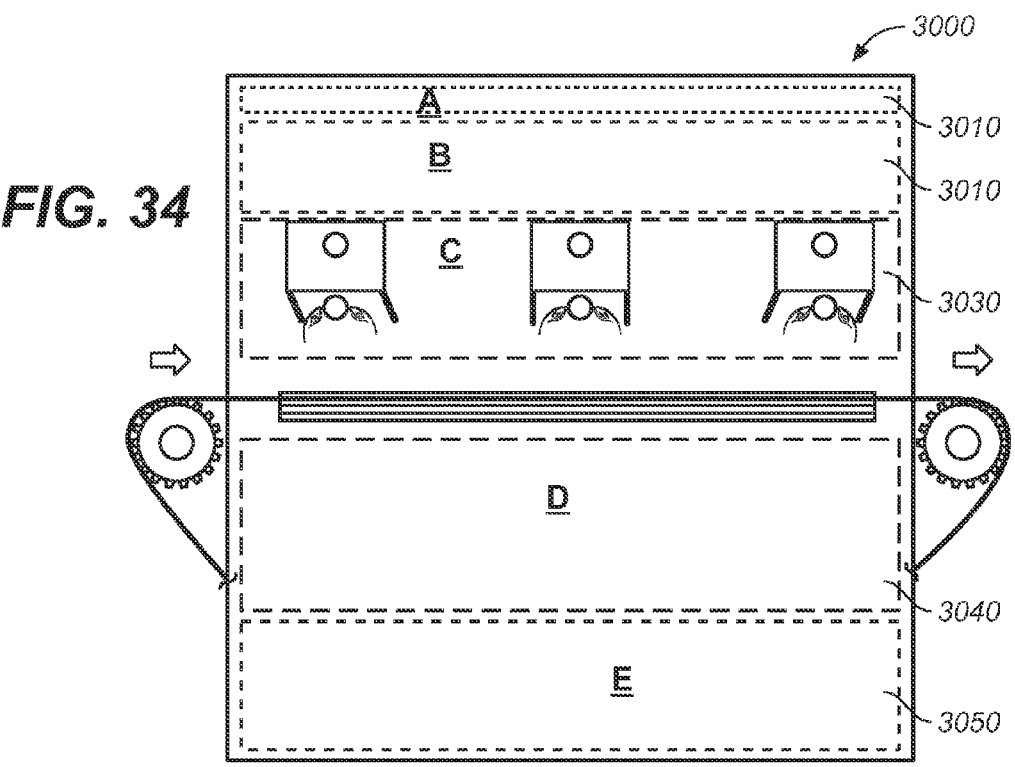
FIG. 34 is a schematic side view in elevation showing a modular conveyor broiler system having its operative elements disposed in a modular form to facilitate rapid removal, replacement, and maintenance of the elements.

FIG. 33 and FIG. 34 contrast a generally unitary cooking chamber housing 2900 containing only the air plenum and burner elements of the inventive design, while FIG. 34 shows a modular system 3000 designed to facilitate the rapid removal and replacement of the operative elements of the conveyor broiler of the present invention. Specifically, this assembly includes a first module, A, 3010, which comprises a slide-in catalyst panel disposed in the upper cooking chamber support on or snapped into brackets; a second module B, 3020, which is a heat exchange module that contains heat exchange tubes having at least one air inlet tube coupled to an air supply at one end and to one of the air plenums at another end, each through rapid connect fittings; a third module C, 3030, containing the burner/air plenum assemblies, which are coupled to gas and air sources, as described above, preferably through rapid connect fittings; a fourth module D, 3040, containing lower burners/heating elements, also connected to gas or electricity with rapid connecting fitting; and a fifth module, E, 3050, which is a lower catch basin drawer for collecting grease, food particles, and cooking residue. The modules are in a stacked relationship, but each e can be removed as an entire module for cleaning, maintenance and repair, and replacement. For cleaning, the entire module can be immersed in a bath of suitable solvent while a back up module is snapped into place. This assembly dramatically reduces the downtime of any cooking platform and thereby results in dramatic cost savings and increased customer satisfaction.

Dramatic energy savings achieved by the inventive waste heat recovery system were confirmed in tests conducted by Fisher-Nickel, Inc., an independent food service equipment testing company headquartered in San Ramon, Calif., at the Food Service Technology Center of Pacific Gas and Electric Company. The tests were conducted on three different commercial grade conveyor broilers. In each test the idle energy consumption, cooking energy consumption, and production capacity of a proprietary fast food cooking platform that did not include the waste heat recovery system was compared with those containing the inventive system. The results are set forth below.

EXAMPLE 1

In a first test, the Nieco 624 gas conveyor broiler, which is a standard platform for a first major fast food restaurant chain (Chain X, name withheld), was compared to a newer system, the JF62 gas conveyor broiler, which was modified to incorporate the inventive waste heat recovery system. The Nieco 624 gas conveyor broiler is a standard pass-through design with a single chain running through the cooking chamber that accommodates three cooking lanes for product (e.g., hamburger patties), three rows deep. A catch tray at the end of the conveyor collects the cooked product. In operation in typical franchise establishment, the conveyor runs continuously during the day, with the heat source constantly energized. The broiler uses infrared gas burners to heat the broiling chamber and electric motors to drive the conveyor through the chamber. A secondary chain runs beneath the main cooking chamber with electrically-heated platens for toasting buns.

The new JF62 conveyor broiler utilizes the inventive waste heat recovery system to recycle waste heat from the radiant heat source and uses that to enhance cooking, and it utilizes a air plenums and heat transfer pipes to capture heat from the cooking chamber and a blower to force the hot air back down onto the food product, all as described above. Because the convective heat transfer maximizes the heat to the food product, the burner size may be reduced substantially over traditional radiant-only designs. The recycled heat also warms a toasting platen and eliminates the need for additional electric resistance heat for the bun toasting platens.

The objective of the test program was to evaluate the idle, cooking energy consumption and production capacity of the three different conveyor broiler designs for use in Chain X restaurants. The conveyor broilers were evaluated in accordance with the ASTM test method for conveyor broilers, using a representative test product-¼-pound frozen hamburger patties. Operating cost models were developed to compare the estimated annual energy consumption and operating cost within a Chain X restaurant.

Savings are based on the Food Service Technology Center testing of the Nieco conveyor broilers under the conditions of the ASTM Standard Test Method for the Performance of Conveyor Broilers (F2239-03). The scope of the testing was as follows: (1) verify that the appliances are operating at the manufacturer's rated energy input; (2) determine the time and energy required to preheat the appliances from room temperature to a stabilized operating condition; (3) determine the idle energy rate with the appliances set to maintain a ready-to-use state while not cooking product; (4) determine the cooking energy consumption and product capacity of the appliances as they were used to cook heavy (full) loads of frozen, 20% fat, ¼-pound hamburger patties; and (5) compare the estimated operating costs for the broilers using a standard cost model.

The following summarizes the tests conducted by the FSTC to compare the energy consumption of the existing conveyorized broiler platform and the proposed JF62 broiler.

Energy Input Rate: Prior to testing, the energy input rate was measure and compared with the manufacturer's nameplate value. This procedure ensured that the appliances were operating within specified parameters. The measured energy input rate for the 624 conveyor broiler, was 67,900 Btu/h and 2.52 kW, for the gas and electric sources, respectively. The measured energy in put rate for the JF62 broiler was 28,590 Btu/h and 0.20 kW, for the gas and electric sources, respectively.

Preheat and Idle Tests: These tests show how the appliances use energy when not cooking or holding food. The preheat time allows an operator to know precisely how long it takes the appliance to be ready to operate. The idle energy rate represents the energy required to maintain stabilized operating conditions, or the appliance's stand-by losses. The preheat test was conducted after the appliance had stabilized at room temperature (75±5° F.) overnight. The 624 broiler preheated in 10.0 minutes, while consuming 11,317 Btu of gas and 0.42 kWh of electricity. The JF62 broiler required 28.5 minutes to preheat, while consuming 13,502 Btu of gas and 0.10 kWh of electricity.

After each cooking unit had preheated, it was allowed to stabilize at operating temperature for one hour. Time and energy consumption were monitored for an additional two hours while the unit maintained a ready-to-use state. The 624 broiler had a gas idle rate of 54,390 Btu/h and an electric rate of 1.83 kW during the idle tests. The JF62 broiler had a gas idle rate of 27,830 Btu/h and an electric rate of 0.20 kW during the idle tests.

Cooking Test: The cooking tests were designed to reflect the appliance's maximum performance under load. The cooking tests were conducted with frozen, quarter-pound, 20% fat hamburger patties. Each broiler was tested using five complete cavity loads of burgers, the first and last loads were considered stabilization loads. After cooking, the patties were collected from the discharge pans and placed on a wire rack for two minutes before being weighed.

During these heavy-load cooking tests, the 624 broiler had a gas cooking energy rate of 54,390 Btu/h and an electric rate of 1.84 kW, while producing burgers at a rate of 28.9 lb/h. The heavy-load cooking tests on the JF62 broiler showed a gas cooking energy rate of 28,420 Btu/h and an electric rate of 0.20 kW, while producing burgers at a rate of 20.8 lb/h.

Energy Savings Estimation Methodologies: Measure data for cost effectiveness modeling are based on equipment use characteristics for Chain X conveyor broilers in a typical store. A simple cost model was developed to calculate the relationship between the various cost components (e.g. preheat, idle and cooking costs) and annual operating cost, using laboratory test data. For this model, the broiler was operated over an 12 hour day, 364 days per year. The idle time was calculated as the difference between the total operating hours and the time cooking and preheating for each appliance. Unitized cost effectiveness determinants are summarized in Table 1, FIG. 35. Annual energy use was calculated based on preheat, idle, and cooking energy cost. Annual energy use this example is based on the broiler operating for 12 hours a day; 364 days per year, with one preheat daily and cooking 100 pounds of product per day. The assumed energy cost is $1.00 per therm or natural gas and $0.13/kWh for electricity.

In reviewing the Table of FIG. 35, the operating estimates ate to be understood as being based on the procedure of calculating daily energy consumption of a conveyor broiler, adapted from the procedure for calculating daily energy consumption of conveyor broilers based on reported test results, as found in Appendix X2 in ASTM F2239. Energy and cost savings for the JF62 broiler tested were based on the Nieco 624 broiler with a catalyst as the baseline. And the estimated useful life is based on the 2008 DEER estimates for food services equipment found in the California Department of Utilities Energy Efficiency Policy Manual, Table 4.1.

Daily Energy Consumption Calculation and Definitions: $EDAY=(LBFOOD \pm PC) \times COOKRATE + [IDLERATE \times (TON - LBFOOD/PC - nP \times TP/60)] + nP \times EP$, which equation employs the following nomenclature:

EDAY=Daily Energy Consumption (Btu/day)
LBFOOD=Pounds of Food Cooked per Day
COOK RATE=Heavy Load Cooking Energy Rate (Btu/h)
IDLE RATE=Idle Energy Rate (Btu/h)
TON=Operating Hours/Day
PC=Production Capacity (lbs/hr)
NP=Number of Preheats/Day
TP=Preheat Time (min)
EP=Preheat Energy (kWh/day)

Demand Reduction Estimation Methodologies: An appliance's actual contribution to a building's peak demand may vary significantly depending on its usage pattern in relation to that of other electric equipment in the facility (operating schedule, appliance on time, etc.). The probability of an appliance drawing its average rate during the period that the building peak is set is significantly higher than for any other input rate for that appliance. Therefore, it has been assumed that the probable contribution to the building's peak demand is equal to the appliance's average demand.

The demand reduction estimation is based on measured data for the conveyor broilers as determined by applying the ASTM Standard Test Method for the Performance of Conveyor Broilers. (F2239). ASTM F2239 provides standard conditions under which conveyor broiler energy use is measured. The estimated demand reduction of 1.64 kilowatts is based on data from tests of Nieco 624 and Nieco JF62 conveyor broilers.

Conclusions: Based on applying the ASTM test method, the prototype JF62 effectively replaces the standard 624 conveyor broiler, while cutting the energy consumption in half during both idle and cooking. The results can be used to estimate the annual energy consumption for the broilers in a typical Chain X store. Using a simple cost model to combine the energy consumption under the various operating modes (e.g., preheat, idle and holding), the energy savings potential of the prototype JF62 broiler can be assessed. Based on the energy consumption model, the Nieco 624 conveyor broiler would consume a total of 2,384 therms and 8,048 kWh per year. The JF62 broiler would consume 1,227 therms and 875 kWh per year based on the model. Using $1.00/therm and 13¢/kWh, the 624 broiler will have an estimated operating cost of $3,430/yr and the JF62 broiler will have an estimated operating cost of $1,341/yr, for an annual energy savings of $2,089.

EXAMPLE 2

In second and third tests, a Nieco 1424 gas conveyor broiler (with no catalyst), and a Nieco 1424 gas conveyor broiler (with catalyst) were compared to a new Nieco JF143 gas conveyor broiler with catalyst.

Background: In recent years, conveyor broilers have fallen under mandates by regional Air Quality Management Districts (AQMDs) in the state of California. These AQMDs require conveyor broilers to have an added catalyst to reduce the particulate emissions from cooking meats. The catalyst fits on top of the broiler cooking chamber and converts captured grease into carbon dioxide and water vapor. Testing has shown that the use of a catalyst can reduce the energy consumption of the conveyor broiler by reflecting heat back into the cooking chamber.

The Nieco 1424 gas conveyor broiler is the existing standard cooking platform in two major fast food restaurant chains, Chain Y and Chain Z [actual names withheld as confidential]. As with the 624 conveyor broiler, the 1424 broiler is a standard pass-through design with a single chain running through the cooking chamber that accommodates three cooking lanes for product (e.g., hamburger patties), three rows deep. A catch tray at the end of the conveyor collects the cooked product. The conveyor runs continuously during the day, with the heat source constantly energized. The broiler uses infrared gas burners to heat the broiling chamber and electric motors to drive the conveyor through the chamber. A secondary chain runs beneath the main cooking chamber with electrically-heated platens for toasting buns.

The new JF143 conveyor broiler incorporates the inventive waste heat recycling system described herein. The JF143 broiler has been designed to be operated with a catalyst and is not available without a catalyst. Because the older 1424 broiler is offered with an optional catalyst for controlling grease emissions from the cooking appliance. The Food Service Technology Center (FSTC) conducted standardized laboratory tests on the standard 1424 conveyor broiler with and without a catalyst.

Objective and Scope of Test: The objective and the scope of the test were identical to that of the first test set out in Example 1, above.

Summary of Test Protocol: The following summarizes the tests conducted by the FSTC to compare the energy consumption of the existing conveyorized broiler platform used in Chains Y and Z and the JF143 broiler.

Energy Input Rate: Prior to testing, the energy input rate was measured and compared with the manufacturer's nameplate value. This procedure ensured that the appliances were operating within specified parameters. The measured energy input rate for the 1424 conveyor broiler was 78,700 Btu/h and 3.07 kW, for the gas and electric sources, respectively. The measured energy input rate for the JF143 broiler was 38,466 Btu/h and 0.58 kW, for the gas and electric sources, respectively.

Preheat and Idle Tests: These tests show how the appliances use energy when not cooking or holding food. The preheat time allows an operator to know precisely how long it takes the appliance to be ready to operate. The idle energy rate represents the energy required to maintain stabilized operating conditions, or the appliance's stand-by losses. The preheat test was conducted after the appliance had stabilized at room temperature (75±5° F.) overnight. The 1424 broiler preheated in 8.4 minutes, while consuming 14,133 Btu of gas and 0.45 kWh of electricity. The JF143 broiler required 46.2 minutes to preheat, while consuming 30,388 Btu of gas and 0.71 kWh of electricity.

After each cooking unit had preheated, it was allowed to stabilize at operating temperature for one hour. Time and energy consumption were monitored for an additional two hours while the unit maintained a ready-to-use state. The 1424 broiler had a gas idle rate of 81,970 Btu/h and an electric rate of 1.55 kW during the idle tests. The JF143 broiler had a gas idle rate of 38,160 Btu/h and an electric rate of 0.46 kW during the idle tests.

Cooking Test: The cooking tests were designed to reflect the appliance's maximum performance under load. The cooking tests were conducted with frozen, quarter-pound, 20% fat hamburger patties. Each broiler was tested using five complete cavity loads of burgers, the first and last loads were considered stabilization loads. After cooking, the patties were collected from the discharge pans and placed on wire rack for two minutes before being weighed.

During these heavy-load cooking tests, the 1424 broiler had a gas cooking energy rate of 78,700 Btu/h and an electric rate of 1.43 kW, while production burgers at a rate of 47.6 lb/h. The heavy-load cooking tests on the JF143 broiler showed a gas cooking energy rate of 38,470 Btu/h and an electric rate of 0.58 kW, while producing burgers at a rate of 31.6 lb/h.

Energy Savings Estimation Methodologies: Measure data for cost effectiveness modeling are based in equipment use characteristics for Chain Y conveyor broilers in a typical store. A simple cost model was developed to calculate the relationship between the various cost components (e.g. preheat, idle and cooking costs) and annual operating cost, using laboratory test data. For this model, the production line was operated over an 18 hour day, 364 days per year. The idle time was calculated based on preheat, idle, and cooking energy cost. Annual energy use in this example is based on the broiler operating for 18 hours a day; 364 days per year, with one preheat daily and cooking 355 pounds of product per day. The assumed energy cost is $1.00 per therm pf natural gas and $0.13/kWh for electricity. Results are reflected in the table shown in FIG. 36.

The Daily Energy Consumption Calculation and Definitions are the same as those set out in Example 1, above.

Demand Reduction Estimation Methodologies were the same as those set out for Test 1 as discussed in Example 1, above. The estimated demand reduction of 0.85 kilowatts is based on data from tests of Nieco 1424 and Nieco JF143 conveyor broilers.

Conclusions: Based on applying the ASTM test method, the prototype JF143 effectively replaces the standard 1424 conveyor broiler, while cutting the energy consumption in half during both idle and cooking. The results can be used to estimate the annual energy consumption for the broilers in a typical Chain Y store. Using a simple cost model to combine the energy consumption under the various operating modes (e.g., preheat, idle and holding), the energy savings potential of the prototype JF143 broiler can be assessed. Based on the energy consumption model, the Nieco 1424 conveyor broiler would consume a total of 5,134 therms and 9,868 kWh per year. The JF143 broiler would consume 2,536 therms and 4,307 kWh per year based on the model. Using $1.00/therm and 13¢/kWh, the 1424 broiler will have an estimated operating cost of $6,417/yr and the JF143 broiler will have an estimated operating cost of $3,096/yr, for an annual energy savings of $3,321.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

The invention claimed is:

1. A waste heat recovery system for broilers, ovens, and toasters, comprising:
   a cooking chamber having an upper portion, a lower portion, and a middle portion having a cooking platform on which to cook food product;
   at least two air plenums disposed in said upper portion of said cooking chamber, each of said at least two air plenums having an interior volume in fluid communication with a source of pressurized air and having a plurality of air outlets for producing a focused body of moving and guided forced air;
   each of said at least two air plenums comprises a box having a top side wall, a right side wall, a left side wall, and a bottom side wall;
   a heating element or burner disposed proximate said bottom side wall of each of said at least two air plenums, such that said focused body of moving and guided forced air guides and directs heat away from said heating element or burner and toward food product being cooked; and
   heat exchange pipes disposed above each of said heating element or burner proximate to or integrated into each of said top side wall of said box;
   wherein each of said at least two air plenums includes at least two wings disposed on said bottom side wall of said box, each wing running generally longitudinally along the length of said air plenum and having an air trough with a plurality of air outlets disposed in the bottom of said trough;
   wherein said wings angle inwardly toward the center of said cooking chamber;
   wherein said heating element or burner is positioned between said wings and proximate said bottom side wall of said box, such that said heating element or burner provides radiant heating during cooking and forced air released through said air outlets forms curtains that contain and guide the heat provided by said heating element or burner.

2. The system of claim 1, further including baffle apparatus disposed proximate to or integrated into said air plenums, and wherein heated cooking air rising from said lower portion and said middle portion is at least temporarily confined around said heat exchange pipes so as to transfer heat generated from said heating cooking elements or burners to air passing through said heat exchange pipes.

3. The system of claim 1, wherein said cooking platform is a moving food product conveyor.

4. The system of claim 1, further including a reflective shroud interposed between each of said heating element or burner and said air plenum to augment radiant heating.

5. The system of claim 1, wherein said at least two air plenums are removably installed in said cooking chamber in a snap-in quick release and installation apparatus disposed on at least one interior side of said cooking chamber such that said air plenums can be rapidly removed and reinstalled.

6. A food cooking apparatus, comprising:
   a cooking chamber having an upper portion, a lower portion, and a middle portion having a cooking platform on which to cook food product;
   at least two heating elements or gas burners;
   a pressurized air system for producing a moving body of focused forced air from said at least two electric heating elements or gas burners toward food product being cooked in said cooking chamber, said pressurized air system including at least two air plenums disposed in said upper portion of said cooking chamber and having an interior volume and a plurality of air outlets through which pressurized air exits to produce the moving body of focused forced air;
   a source of pressurized air in fluid communication with said interior of said at least two air plenums;
   each of said at least two air plenums comprises a box having a top side wall, a right side wall, a left side wall, and a bottom side wall;
   wherein each of said at least two air plenums includes at least two wings disposed on said bottom side wall of said box, each wing running generally longitudinally along the length of said air plenum and having an air trough with a plurality of air outlets disposed in the bottom of said trough;
   wherein said wings angle inwardly toward the center of said cooking chamber;
   wherein each of said at least two heating elements or gas burners is positioned between said wings and proximate said bottom side wall of each of said at least two air plenums, such that said heating elements or gas burners provide radiant heating during cooking and forced air released through said air outlets forms curtains that contain and guide the heat provided by said heating element or burner;
   a waste heat recovery system, comprising at least one heat exchange air supply pipe disposed between said at least two air plenums and in said upper portion of said cooking chamber between and connecting said pressurized air source and each of said at least two air plenum, wherein heat from said lower and middle portions of said cooking chamber heats said at least one heat exchange air supply pipe and thereby the pressurized air flowing through said heat exchange air supply pipe before the pressurized air flows into said at least two air plenums and out said plurality of air outlets disposed in said at least two air plenums.

7. The system of claim 6, further including a baffle disposed above said air plenums and said heat exchange air supply pipes, wherein heated air rising from said lower portion and said middle portion of said cooking chamber is retained proximate said heat exchange air supply pipes so as to increase effective heat transfer to said heat exchange air supply pipes.

8. The system of claim 6, further including a reflective shroud interposed between each of said heating elements or gas burners and said at least two air plenums to augment radiant heating.

9. The system of claim 6, wherein said at least two air plenums are removably installed in said cooking chamber in a snap-in quick release brackets.

\* \* \* \* \*